United States Patent
Lee et al.

(10) Patent No.: US 11,525,596 B2
(45) Date of Patent: Dec. 13, 2022

(54) METHODS AND SYSTEMS FOR TRAINING HVAC CONTROL USING SIMULATED AND REAL EXPERIENCE DATA

(71) Applicant: Johnson Controls Tyco IP Holdings LLP, Milwaukee, WI (US)

(72) Inventors: Young M. Lee, Old Westbury, NY (US); Zhanhong Jiang, Milwaukee, WI (US); Viswanath Ramamurti, San Leandro, CA (US); Sugumar Murugesan, Santa Clara, CA (US); Kirk H. Drees, Cedarburg, WI (US); Michael James Risbeck, Madison, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 96 days.

(21) Appl. No.: 16/725,961

(22) Filed: Dec. 23, 2019

(65) Prior Publication Data
US 2021/0190364 A1    Jun. 24, 2021

(51) Int. Cl.
G05B 13/04    (2006.01)
G05B 13/02    (2006.01)
F24F 11/64    (2018.01)
F24F 11/47    (2018.01)

(52) U.S. Cl.
CPC ............. F24F 11/64 (2018.01); F24F 11/47 (2018.01); G05B 13/027 (2013.01); G05B 13/04 (2013.01)

(58) Field of Classification Search
None
See application file for complete search history.

(56) References Cited

U.S. PATENT DOCUMENTS

| | | | | |
|---|---|---|---|---|
| 2017/0285584 | A1* | 10/2017 | Nakagawa | B25J 9/1671 |
| 2019/0061147 | A1* | 2/2019 | Luciw | B25J 9/163 |
| 2020/0167686 | A1* | 5/2020 | Mallya Kasaragod | G06F 30/20 |

(Continued)

OTHER PUBLICATIONS

Zhengbo Zou, Xinran Yu, Semiha Ergan, Towards optimal control of air handling units using deep reinforcement learning and recurrent neural network, Building and Environment, <https://doi.org/10.1016/j.buildenv.2019.106535.> (Year: 2019).*

(Continued)

Primary Examiner — Kenneth M Lo
Assistant Examiner — Istiaque Ahmed
(74) Attorney, Agent, or Firm — Foley & Lardner LLP

(57) ABSTRACT

Systems and methods for training a reinforcement learning (RL) model for HVAC control are disclosed herein. Simulated experience data for the HVAC system is generated or received. The simulated experience data is used to initially train the RL model for HVAC control. The HVAC system operates within a building using the RL model and generates real experience data. A determination may be made to retrain the RL model. The real experience data is used to retrain the RL model. In some embodiments, both the simulated and real experience data are used to retrain the RL model. Experience data may be sampled according to various sampling functions. The RL model may be retrained multiple times over time. The RL model may be retrained less frequently over time as more real experience data is used to train the RL model.

26 Claims, 12 Drawing Sheets

(56) References Cited

U.S. PATENT DOCUMENTS

| | | | |
|---|---|---|---|
| 2020/0272905 A1* | 8/2020 | Saripalli | G06N 3/006 |
| 2020/0310442 A1* | 10/2020 | Halder | G05D 1/0212 |
| 2020/0356855 A1* | 11/2020 | Yeh | G06N 3/08 |
| 2021/0200163 A1* | 7/2021 | Nagarathinam | G05B 15/02 |
| 2021/0201526 A1* | 7/2021 | Moloney | G06N 3/0454 |

OTHER PUBLICATIONS

Cheng Fan, A novel methodology to explain and evaluate data-driven building energy performance models based on interpretable machine learning, Nov. 2018, <https://doi.org/10.1016/j.apenergy.2018.11.081> (Year: 2018).*

Wei, Tianshu et al., Deep Reinforcement Learning for Building HVAC Control, DAC '17, Jun. 18-22, 2017, 6 pages.

* cited by examiner

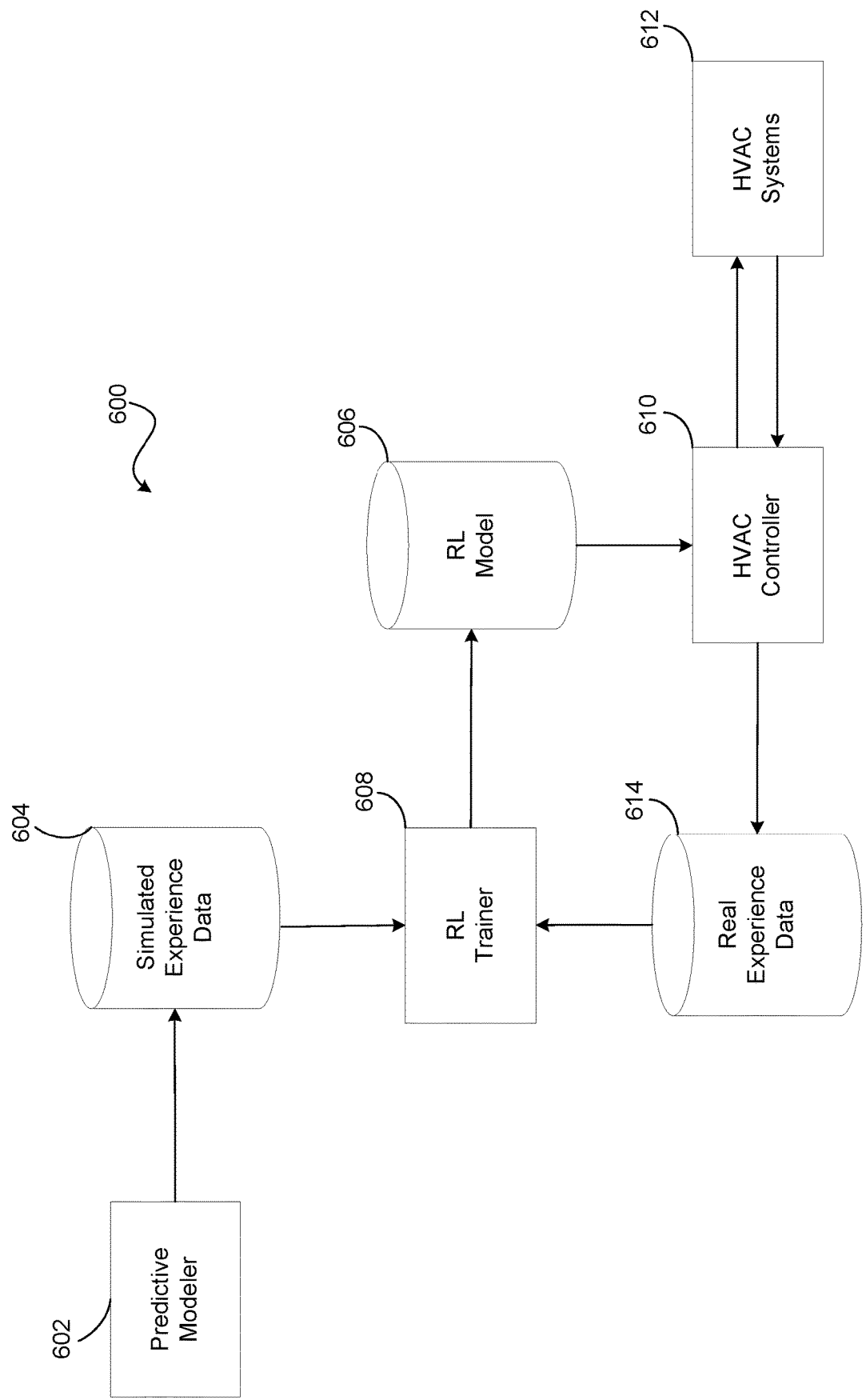

METHODS AND SYSTEMS FOR TRAINING HVAC CONTROL USING SIMULATED AND REAL EXPERIENCE DATA

BACKGROUND

The present disclosure relates generally to heating, ventilation, and air conditioning (HVAC) control systems, and more particularly to training models used to control HVAC systems.

Generally, an HVAC system controls the temperature of a building, zone, or space based on a temperature setpoint. An HVAC system can be integrated into a building management system (BMS) to monitor and control the HVAC system. Optimizing a control schedule of the HVAC system can significantly reduce the energy consumption and cost of the building system.

SUMMARY

According to some embodiments, a method for training a reinforcement learning (RL) model for HVAC control is disclosed. The method includes receiving first experience data for the HVAC system, the first experience data being simulated experience data, training the RL model using the first experience data, receiving second experience data for the HVAC system, the second experience data generated responsive to operation of the HVAC using the RL model, and retraining the RL model using the second experience data.

In some embodiments, the first experience data is generated using a simulation model or a surrogate model of the HVAC system, wherein the surrogate model can include a deep neural network.

In some embodiments, the RL model is a deep reinforcement learning (DRL) model.

In some embodiments, the method further comprises determining whether to retrain the RL model based on a probability function by generating a random value and responsive to the random value satisfying a criteria, determining the RL model will be retrained.

In some embodiments, the probability function decreases the likelihood the RL model will be retrained over time.

In some embodiments, both the first and second experience data are used to retrain the RL model.

In some embodiments, the first and second experience data are sampled for training data according to a sampling function.

In some embodiments, the sampling function is based on a model error metric between the model output and the expected output.

In some embodiments, the sampling function is based on previously sampled experience data.

According to various embodiments, a system for training an RL model for HVAC control is disclosed. The system comprises one or more processing circuits configured to generate simulated experience data for an HVAC system, train the RL model using the simulated experience data, generate real experience data using information received from the HVAC system during operation, and retrain the RL model using the real experience data.

In some embodiments, the one or more processing circuits are integrated within a building management system.

In some embodiments, a simulation model or surrogate model are used to generate the simulated experience data, the simulation model or surrogate model configured to predict the response of the building or HVAC system to an input.

In some embodiments, the RL model is a deep reinforcement model.

In some embodiments, the system uses both real and simulated experience data to retrain the RL model.

In some embodiments, the real and simulated experience data is sampled according to a sampling function.

In some embodiments, the real and simulated experience data are sampled separately.

In some embodiments, the system determines a state of the HVAC system and inputs the state into the RL model to determine one or more control actions for the HVAC system.

In some embodiments, the system determines whether to retrain the RL model based on a probability function, where a random value is generated and compared to a criteria to satisfy.

In some embodiments, the probability function decreases the likelihood that the RL model will be retrained over time.

According to various embodiments, one or more computer readable storage media are disclosed, wherein the one or more computer readable storage media have instructions stored thereon that, when executed by one or more processors, cause the one or more processors to generate simulated experience data for an HVAC system using a dynamics model, train a deep reinforcement learning (DRL) model for the HVAC system using the simulated experience data, send one or more control instructions to the HVAC system based on an output of the DRL model, generate real experience data using information received from the HVAC system, and retrain the RL model using the real experience data.

In some embodiments, the dynamics model is a surrogate model or a simulation model, the surrogate model including a deep neural network.

In some embodiments, the one or more processors are further configured to determine whether to retrain the DRL model based on a probability function, wherein a random value is generated and compared to criteria to satisfy the determination to retrain the DRL model.

In some embodiments, the real and simulated experience data are sampled to retrain the DRL model.

According to the various embodiments, another method for training a reinforcement learning (RL) model is disclosed. The method comprises receiving first experience data, training a surrogate model of the HVAC system using the first experience data, training a RL model using second experience data, the second experience data being simulated experience data generated using the trained surrogate model, receiving third experience data, the third experience data generated responsive to responsive to control actions determined using the RL model of the HVAC system, retraining the surrogate model using the third experience data, and retraining the RL model using fourth experience data, the fourth experience data generated using the retrained surrogate model.

In some embodiments, the first experience data is simulated experience data generated using a calibrated simulation model or real experience data generated responsive to operation of the HVAC in an offline period.

In some embodiments, the surrogate model comprises a deep neural network (DNN) to predict the response of the system to input.

In some embodiments, the method further comprises determining whether to retrain the RL model based on a probability function, the probability function responsive to a generated random value satisfying a criteria, wherein the surrogate model is retrained responsive to the determining to retrain the RL model.

In some embodiments, both the third experience data and the fourth experience data are used to retrain the RL model.

In some embodiments, the third experience data and the fourth experience data are sampled according to a sampling function for training data for the retraining of RL model.

In some embodiments, the sampling function is based on a model error metric between an output of the RL model and an expected output of the RL model.

In some embodiments, the first experience data is sampled based on previous sampled training data.

According to various embodiments, another system for training an RL model is disclosed. The system comprises one or more processing circuits configured to receive initial experience data generated by a calibrated simulation model of the HVAC system, train a surrogate model of the HVAC system using the initial experience data, generate first simulated experience data using the trained surrogate model; train an RL control model using the first simulated experience data, receive real experience data generated responsive to controlling the HVAC system using the RL control model, retrain the surrogate model using the real experience data, generate second simulated experience data using the retrained surrogate model, and retrain the RL control model using at least the second simulated experience data.

In some embodiments, the one or more processing circuits are configured to

In some embodiments, the one or more processing circuits are integrated within a building management system.

In some embodiments, the surrogate model includes a deep neural network to predict the response of the HVAC system to input.

In some embodiments, both the second simulated experience data and the real experience data are used to retrain the RL model.

In some embodiments, the one or more processing circuits are further configured to initialize the RL model to generate random control actions for the HVAC system, and receive random experience data generated responsive to controlling the HVAC system using the initialized RL model, wherein the random experience data is used in addition to the initial experience data to train the surrogate model.

In some embodiments, the random experience data is generated over a short period of time relative to a time period over which the real experience data is generated.

In some embodiments, the one or more processing circuits are configured to determine a state of the HVAC system from the received information, and input the state into the RL model to determine one or more control actions.

In some embodiments, the one or more processing circuits are configured to determine whether to retrain the RL model or surrogate model based on a probability function, the probability function including a random value, the random value compared to criteria to determine whether to retrain the RL model or surrogate model.

In some embodiments, the probability function decreases a probability the RL model or surrogate model will be retrained over time.

According to various embodiments, another one or more computer readable storage media are disclosed, the one or more storage media having instructions stored thereon that, when executed by one or more processors, cause the one or more processors to generate training data using a calibrated simulation model of a building, train a surrogate model of an HVAC system using the training data, generate first simulated experience data using the trained surrogate model, train a deep reinforcement learning (DRL) model for control of the HVAC system using the first simulated experience data, send one or more control instructions to the HVAC system, the one or more control instructions determined based on the DRL model, receive real experience data for the HVAC system, the real experience data generated responsive to operation of the HVAC system using the one or more control instructions, retrain the surrogate model using the real experience data, generate second simulated experience data using the retrained surrogate model, and retrain the DRL model using the second simulated experience data.

In some embodiments, the one or more processing circuits are further caused to determine whether to retrain the DRL model based on a probability function, the probability function comprising generating a random value, comparing the random value to criteria, and determine the DRL model should be retrained based on the random value satisfying the criteria.

In some embodiments, the probability function decreases the likelihood the DRL model will be retrained over time.

In some embodiments, the DRL model is retrained using the real experience data and the second simulated experience data.

In some embodiments, the one or more processors are further caused to sample the second simulated experience data according to a sampling function to retrain the DRL model.

BRIEF DESCRIPTION OF THE DRAWINGS

FIG. 6 is a block diagram of a building control system using a reinforcement learning model, according to some embodiments.

DETAILED DESCRIPTION

Overview

Figure 1:
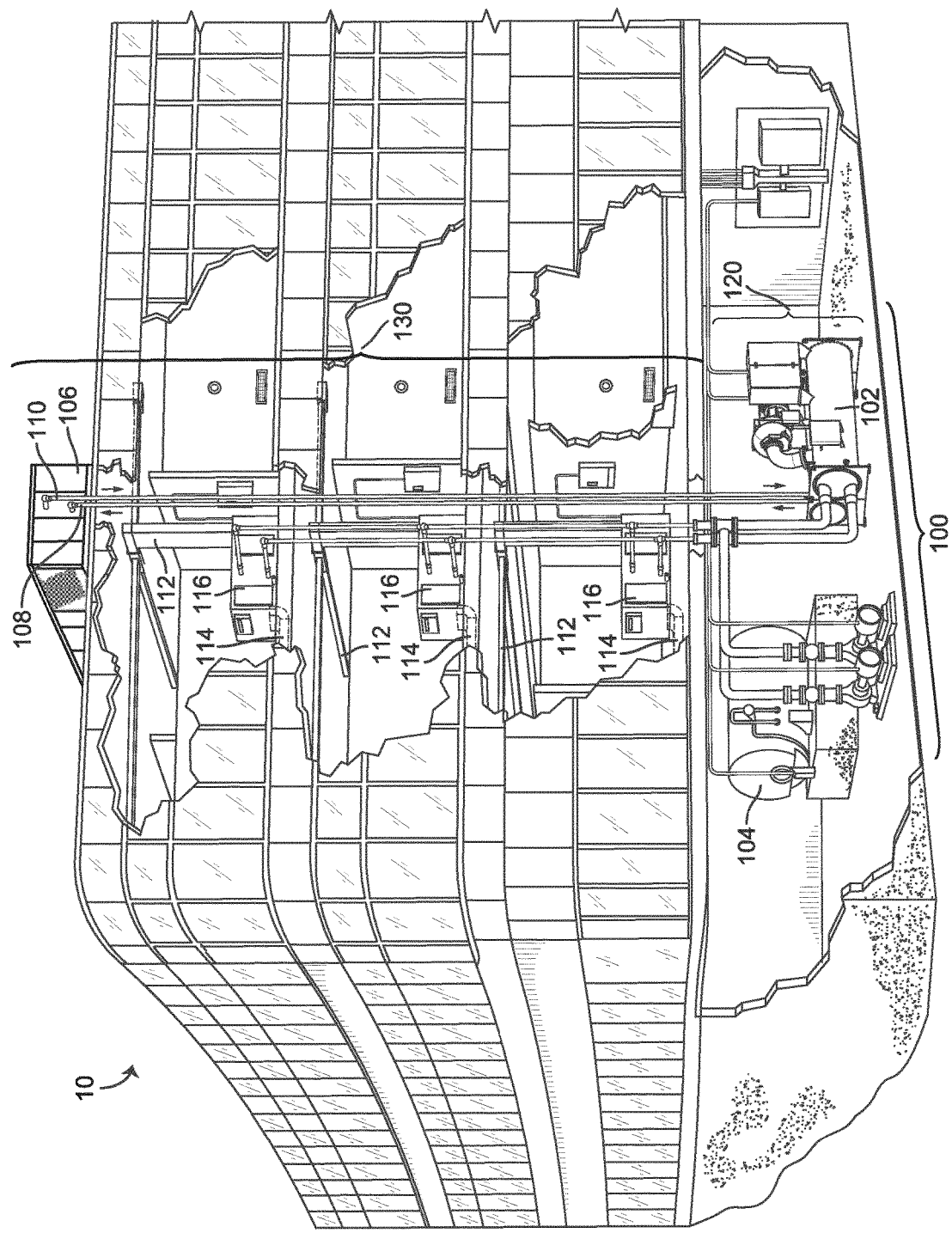
FIG. 1 is a perspective view of a smart building, according to some embodiments.

Referring generally to the figures, methods and systems for training a reinforcement learning (RL) model for control of an HVAC system are disclosed. A RL model can be trained using simulated and real experience data to determine a control action for the HVAC system based on the current state of the system. The methods and systems disclosed herein provided advantageous form and function to improve the training of RL models and overall control of the HVAC system using the RL model.

RL models require a substantial amount of data to train the model to be able to accurately determine the preferred action to perform in response to a given system state. Simulated experience data can be generated relatively quickly, but may not accurately capture the actual operation and dynamics of a particular HVAC system. Real experience data typically is collected slowly over a long period of time, such that a system may require real experience data to be measured for over a year before enough data is collected to adequately train a RL model. Accordingly, there exists a need to accurately train a RL control model that improves control in both the short-term and long-term.

The present disclosure provides a solution to this problem by mixing simulated and real experience data to train a RL model. Simulated experience data is generated using a dynamic model of the HVAC system. The simulated experience data is used to initially train the RL model, and over time as real experience data is collected from the HVAC system, the RL model is retrained using the real experience data. In some embodiments, the real experience data is additionally or alternatively used to retrain the dynamic model to generate additional simulated experience data to train the RL. The present disclosure can generally utilize simulated experience data during the initial operation of the RL control model, and improve the model control policy over time using the measured experience data to reach an improved HVAC control.

For use with a RL model, experience data can generally include, but is not limited to, the current state of a system at a given time, one or more actions performed by the controller in response to the current state of the system, a future or resultant state of the system caused by the performed action, and/or a determined reward responsive to performing the action in the current state. Experience data may also include other values, such as other valuation metrics or error measurements.

The simulated experience data may be data generated by a prediction model of the particular HVAC system to predict future states and rewards of the system, but does not actually rely on measurements from actual operation of the particular HVAC system. Simulated experience data may be generated using data measured by different HVAC systems or otherwise rely on other HVAC operational knowledge or experience. Real experience data (used interchangeably with measured experience data, actual experience data) should be appreciated to be defined as data measured by the particular HVAC system during operation. Real experience data may be measured or collected while the particular HVAC system is using the RL model or any other control algorithm to control operation of the HVAC system. The system may be configured to associate a state-action pair with a measured reward or future state.

Building and HVAC Systems

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Figure 2:
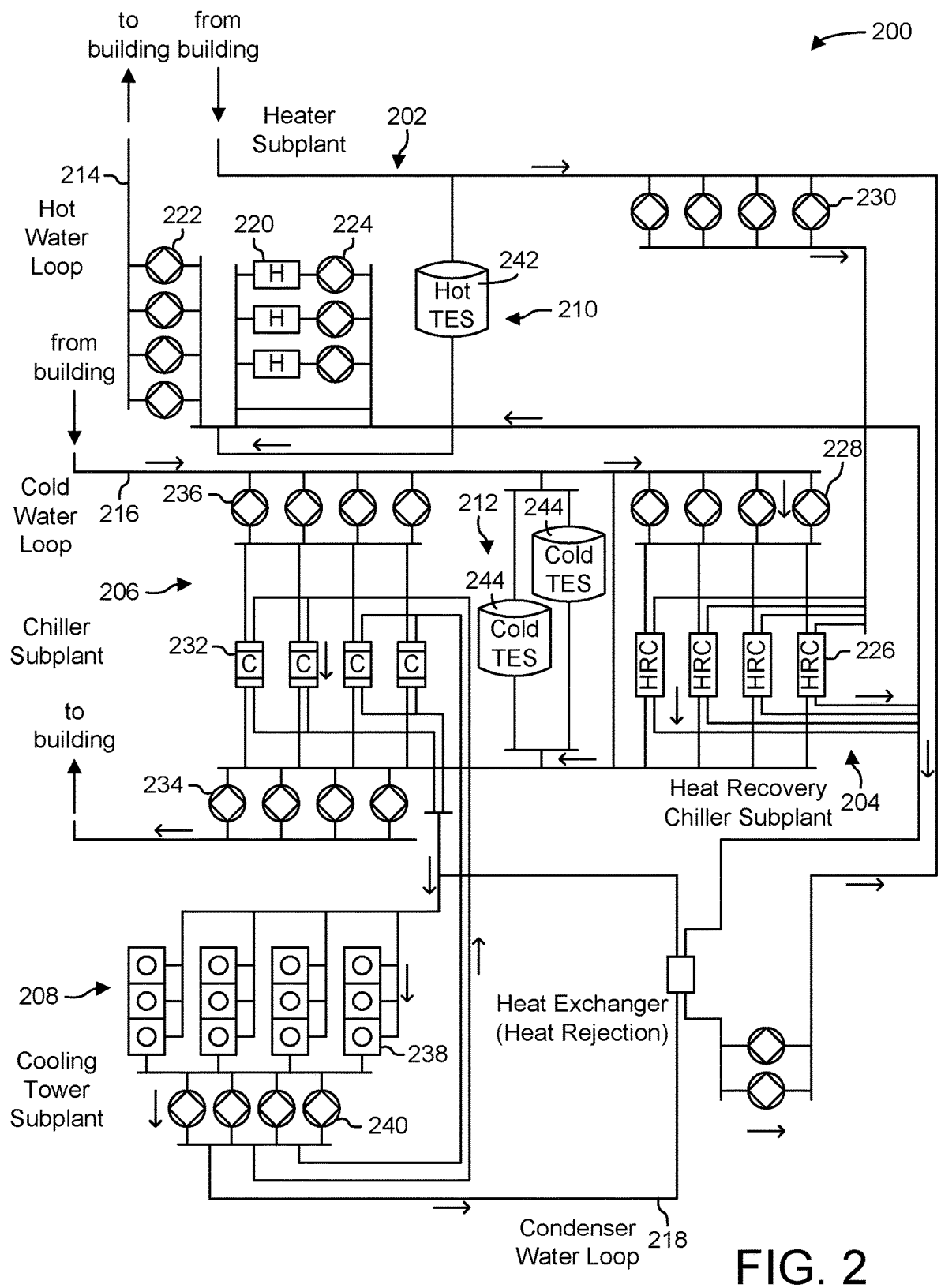
FIG. 2 is a block diagram of a waterside system, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Figure 3:
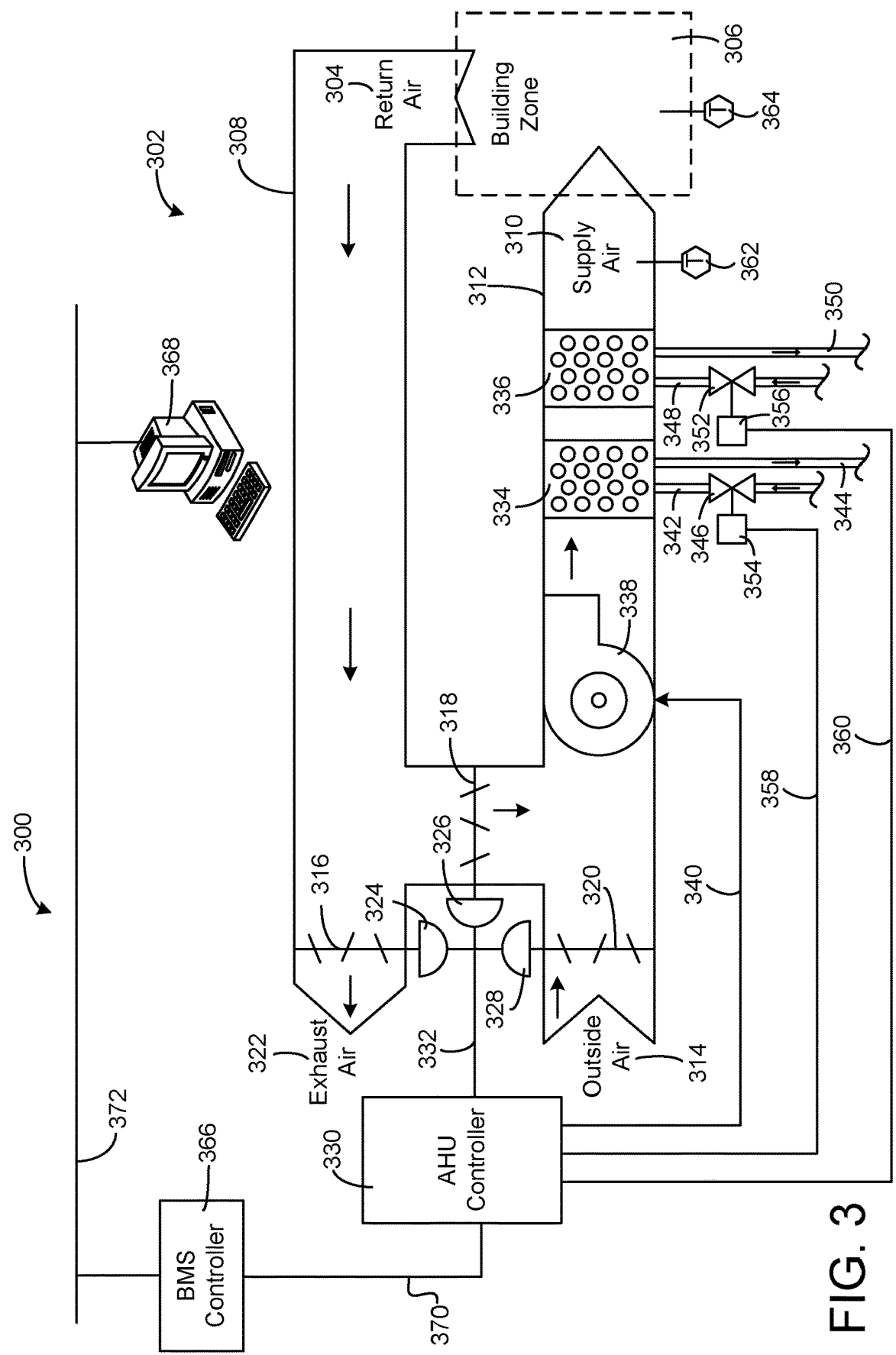
FIG. 3 is a block diagram of an airside system, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Figure 4:
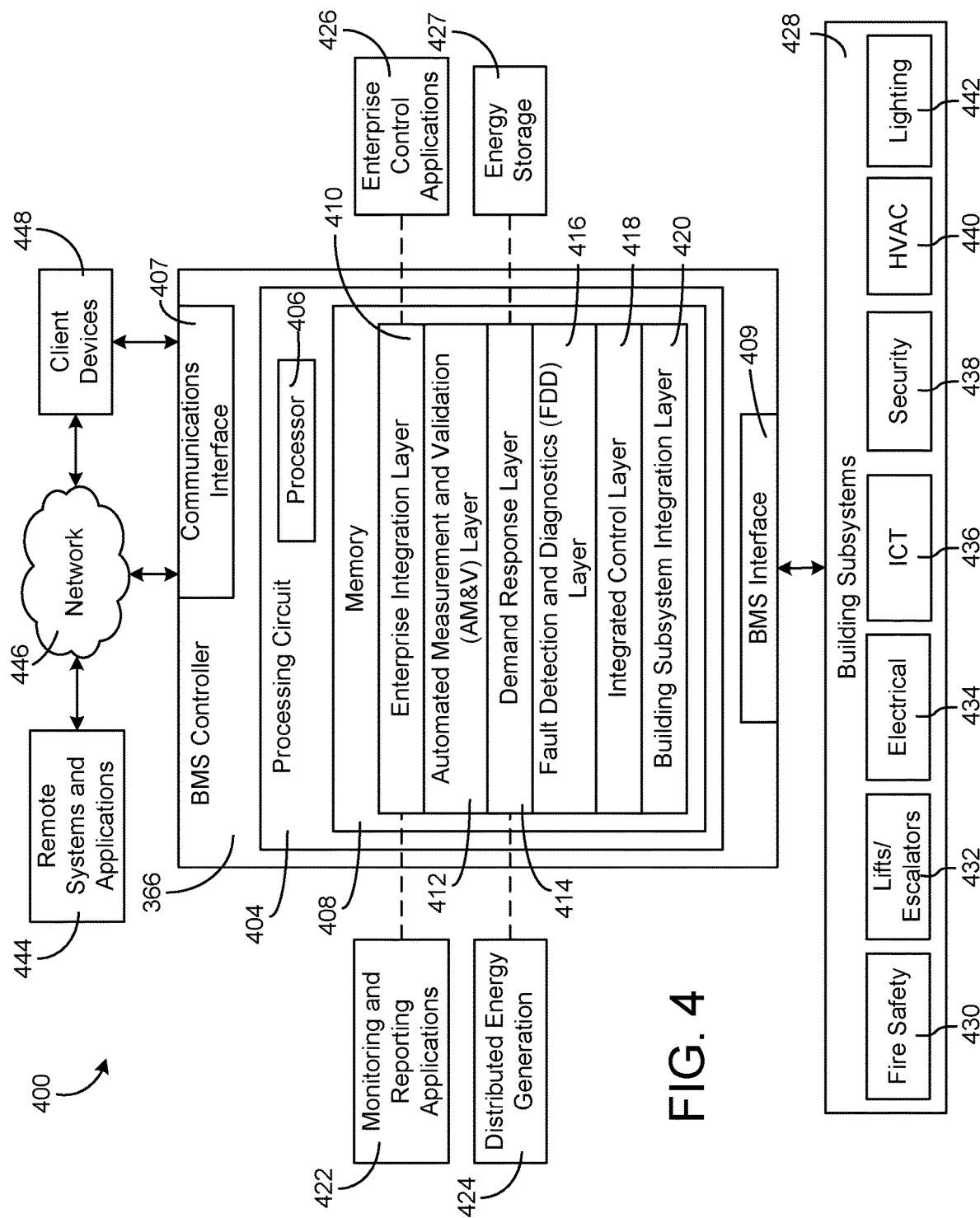
FIG. 4 is a block diagram of a building management system, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In some embodiments, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine control actions for building subsystems 428 based on the inputs, generate control signals based on the determined control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine a set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
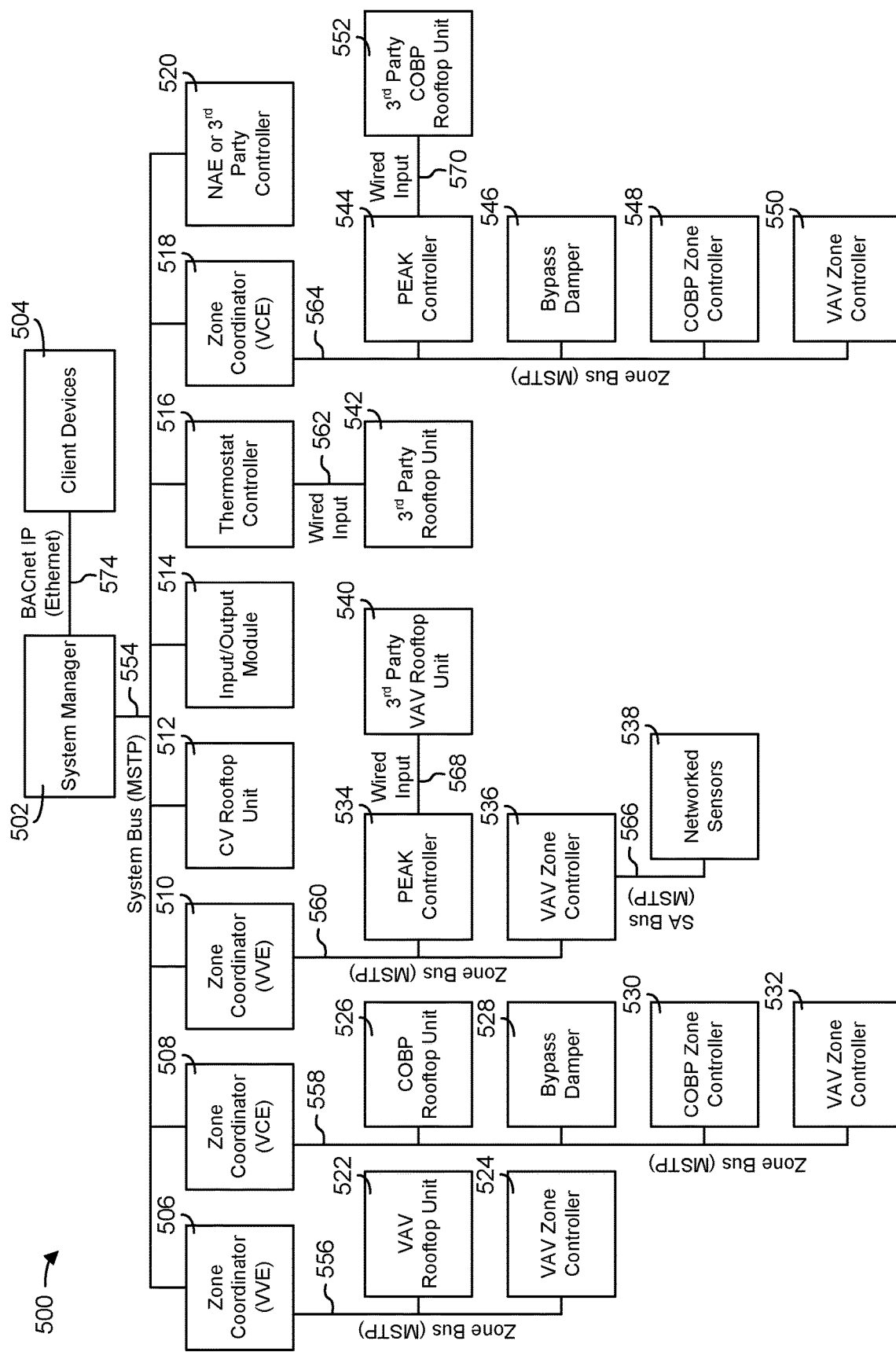
FIG. 5 is a block diagram of a smart building environment, according to some embodiments.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Generating Simulated Experience Data

Generally, to generate simulated experience data, sample input data is input into a dynamics model. The dynamics model can include a calibrated simulation model or a surrogate model of the HVAC system. Sample input data is generally categorized either as an exogenous parameter or an endogenous parameter. Exogenous parameters are parameters pertaining to the environment or otherwise outside of the control of the HVAC system, such as time of day, weather and weather forecasts, occupancy schedules, and occupancy trends. Endogenous parameters are variables chosen by a control system, such as setpoints or operating conditions. For input into the dynamics model, the exogenous and endogenous parameters can be sampled to simulate different scenarios. Any sampling algorithm can be used to sample the exogenous and endogenous parameters. In some embodiments, several different sampling algorithms may be used to vary the state-action pair space for training the RL model.

For example, exogenous parameters may be sampled by first using a fitting algorithm. A fitting algorithm, given a sequence of one or more parameters over time, returns a sequence corresponding to the mean predictions of the parameters. The fitting algorithm can be calculated as follows:

The fitting algorithm receives as input, 1) a sequence of measured parameters $y_t$ indexed 0 through T, where each sample $y_t$ is a vector of I values with $y_{it}$ denoting the value of the (scalar) parameter i; 2) for each scalar parameter i, an integer value $N_i > 0$ to select the number of Fourier modes in that parameter's mean model; and 3) an integer value M selecting the order of the autoregressive correction model.

For each scalar parameter i, the real Fourier transform of the sequence $y_{it}$ is computed to produce values of coefficients $a_j$ and $b_j$ such that:

$$y_{it} = \sum_{j=0}^{\lfloor T/2 \rfloor} (a_j \sin(2\pi jt/T) + b_j \cos(2\pi jt/T))$$

A set $\mathcal{J}$ is then defined to contain 0 and the $N_i$ values of $j > 0$ corresponding to the $N_i$ largest values of $a_j^2 + b_j^2$. The mean sequence $\bar{y}_{it}$ can then be defined as:

$$\bar{y}_{it} := \sum_{j \in \{0\} \cup \mathcal{J}} (a_j \sin(2\pi jt/T) + b_j \cos(2\pi jt/T))$$

From the mean sequence $\bar{y}_{it}$, the residuals can be calculate as:

$$x_{it'} = y_{it} - \bar{y}_{it}$$

and be concatenated into vectors $x_t$.

An autoregressive model of order M is then fitted to predict the values of $x_t$ by solving the least squares problem:

$$\min_{A_1,\ldots,A_M} \sum_{t=M}^{T} \left\| x_t - \sum_{m=1}^{M} A_m x_{t-m} \right\|^2$$

The error covariance E is calculated as the sample covariance of $e_M, \ldots, e_T$, where:

$$e_t := x_t - \sum_{m=1}^{M} A_m x_{t-m}$$

Block matrices $\mathcal{A}$ and $\varepsilon$ can then be calculated as:

$$\mathcal{A} := \begin{pmatrix} 0 & I & 0 & \ldots & 0 & 0 \\ 0 & 0 & I & \ldots & 0 & 0 \\ \vdots & \vdots & \vdots & \ddots & \vdots & \vdots \\ 0 & 0 & 0 & \ldots & I & 0 \\ 0 & 0 & 0 & \ldots & 0 & I \\ A_M & A_{M-1} & A_{M-2} & \ldots & A_2 & A_1 \end{pmatrix}$$

$$\mathcal{E} := \begin{pmatrix} 0 & \ldots & 0 & 0 \\ \vdots & \ddots & \vdots & \vdots \\ 0 & \ldots & 0 & 0 \\ 0 & \ldots & 0 & E \end{pmatrix}$$

such that the discrete Lyapunov equation can be solved to find the matrix X, the Lyapunov equation written as:

$$X = \mathcal{A} X \mathcal{A} + \varepsilon$$

Given a determined starting and ending time $t_0$ and $t_f$, a sampling algorithm then randomly chooses a vector X from the multivariable normal distribution with mean zero and covariance X and splits that vector into M pieces (each length l). Each piece is then defined as $\hat{x}_{t_0-M}$ through $\hat{x}_{t_0-1}$.

For each of $t=t_0, \ldots, t_f$ a vector $e_t$ from the multivariable normal distribution with mean zero and covariance E is randomly chosen. The sequence $\hat{x}_t$ is then calculated as:

$$\hat{x}_t := e_t + \sum_{m=1}^{M} \mathcal{A}_m \hat{x}_{t-m}$$

Finally, for $t=t_0, \ldots, t_f$ the sampled sequence $\hat{y}_t$ is calculated as:

$$\hat{y}_t = \hat{x}_t + \bar{y}_t$$

wherein $\hat{y}_t$ is used as input into the dynamics model.

It should also be appreciated that the sampling algorithm can be extended to generate sequences longer than T steps. Assuming that the data is P-periodic (for example, by making explicit adjustments such that $y_0$ is equal to $y_P$), the fitting algorithm can be performed on the restricted sequence $y_0, \ldots, y_{P-1}$, wherein the mean terms $\bar{y}_t$ is interpreted with t modulo P.

If certain parameters have explicit bounds (e.g., cloud cover expressed as a percentage between 0 and 100), those values can be transformed to an unbounded space before training and then transformed back to the original space after training. For example, given a variable $y_t$ bounded between 0 and 1, determine a value $\epsilon \approx 0$ and train the model on the transformed variable $y'_t$ and use the sampling procedure to determine $\hat{y}'_t$ with $$y'_t := -\log\left(\frac{1}{\epsilon + (1 - 2\epsilon)y_t} - 1\right)$$

$$\hat{y}_t := \frac{1}{1 + \exp(-\hat{y}'_t)}$$

If various subsets of parameters are known to be uncorrelated, order-M autoregressive model and error covariance E can be performed separately on each subset to ensure that the sampled parameters are not explicitly correlated.

In another example, samples of endogenous parameters may be determined according to a random exploration algorithm. A random exploration algorithm outputs a sequence of exogenous parameter values given time varying bounds, a standard deviation $\sigma$, and a quantization step Q. One or more processors executing the random exploration algorithm may first randomly choose an initial value x0 from the uniform distribution on the interval [0,2]. For each time $t=0, 1, \ldots T-1$, a value $e_t$ is randomly chosen from the standard normal distribution, wherein a next x value $x_{t+1}$ is defined as:

$$x_{t+1} = (x_t + \sigma e_t) \bmod 2$$

and a new value $$\tilde{u}_{t'} := u_t^{min} + (u_t^{max} - u_t^{min})|1 - x_t|$$

For each $t=0, \ldots, T$, apply quantization to calculate $$u_t := Q \operatorname{round}\left(\frac{\tilde{u}_t}{Q}\right)$$

In variations of the random exploration algorithm, the value $e_t$ can be forced to zero to constrain a parameter to be constant over a given time interval when $u_t$ should not change.

In another example, endogenous parameters may be sampled according to a random pre-cooling algorithm. Given a sequence of time-varying bounds $u_t^{min}$ and $u_t^{max}$ for $t=0, \ldots, T$ with $t=0$ corresponding to the end of peak hours on the previous day and $t=T$ corresponding to the end of peak hours on the current day, the starting time $t_p$ if peak hours for the current day, and a minimum and maximum transition periods $\tau^{min}$ and $\tau^{max}$ satisfying $\tau^{min} \geq 0$ and $\tau^{max} \leq t_p/2$, one or more processors executing the random pre-cooling algorithm can generate a sequence $u_t$ of a endogenous control parameter that achieves some amount of pre-cooling for an HVAC system. The one or more processors may first randomly choose two values $\tau_1$ and $\tau_2$ from the uniform distribution on the interval $[\tau^{min}, \tau^{max}]$, and a value $t_a$ from the uniform distribution on the interval $[0, t_p - \tau_2]$. Then, defining $t_b := t_0 + \tau_1$ and $t_c := t_p - \tau_2$, for each $t=0, \ldots, T$, define $x_t$ as:

$$x_t := \begin{cases} 0 & \text{if } 0 \le t \le t_a \\ \dfrac{t - t_a}{t_b - t_a} & \text{if } t_a < t \le t_b \\ 1 & \text{if } t_b < t \le t_c \\ \dfrac{t - t_c}{t_p - t_c} & \text{if } t_c < t \le t_p \\ 0 & \text{if } t_p < t \le T \end{cases}$$

and $u_t$ as:

$$u_t = u_t^{max} + (u_t^{min} - u_t^{max}) x_t$$

Various other interpolation methods can be used as part of the pre-cooling method to determine the exact values during transition periods, e.g., exponential transitions with a specified or random decay rate.

In both the random exploration algorithm and the pre-cooling algorithm, if there are rate-of-change limitations on the resulting control decisions, a nearby feasible trajectory can be found via optimization. For example, if the input can change by no more than δ in a given timestep then we can replace $u_t$ via $u'_t$ computed by solving to the following optimization problem:

$$\min_{u'_0, \ldots, u'_t} \sum_{t=0}^{T} |u'_t - u_t|$$

$$\text{s.t.} \quad |u'_t - u'_{t-1}| \le \delta, \quad t = 1, \ldots, T$$

$$u_t^{min} \le u'_t \le u_t^{max}, \quad t = 0, \ldots, T$$

To generate the simulated experience data, a dynamics model is chosen, such as a simulator or surrogate model. A state-action pair is determined. In some embodiments, the state-action pair inputs are sampled from the sample data. In some embodiments, the state-action pair inputs are sampled randomly. The state-action pair is input into the dynamics model such that a next state and observed reward can be generated. The state, action, reward, and next state can be stored in simulated experience storage 604 as a single experience data point. In some embodiments, predictive modeler 602 also calculates other metrics and stores the generated values in association with the experience data point. For example, predictive modeler may calculate the Bellman gap according to the equation:

$$g = L^2_{norm} \left[ Q(s, a) - (r + \gamma * \max_{a'} Q(s', a')) \right]$$

where g is the Bellman gap, s is the current state, a is the current action, Q(s,a) is the Q function for a state-action pair (s,a), γ is the discount rate, s' is the future state after performing action a at state s, r is the reward for performing action a in state s, $$\max_{a'} Q(s', a')$$

is the maximum Q value for all possible actions a' in state s', and $L^2_{norm}$ is a magnitude calculation, calculated as the square root of the sum of the squared vector values.

In embodiments where the dynamics model is a calibrated simulation model, the internal loads, operating strategies, and building parameters of the HVAC system can be loaded into a simulation engine to model building zones and thermal dynamics for the HVAC system in its environment. Weather data may also be introduced to simulate loads over a week, month, or year, for example. The simulation model may then determine actions to perform in a given state and predict a resultant state and reward, such as power consumption or cost that can be structured and stored as simulated experience data for the HVAC system.

In embodiments where the dynamics model is a surrogate model, the surrogate model may include a deep neural network (DNN) model with several types of configurations. In some embodiments, the DNN model may be a structured DNN model and include a decomposition strategy derived from a particular closed-loop control structure of one or more zones of a building. The DNN model may be controlled by a zone controller and zone physics that can be split into two independent subsystems for which all the inputs and outputs are known. The two independent subsystems may be independent, but may still be interconnected. Particularly, the local controllers of each zone may induce a sensible cooling load on the zone, which induces zone heat-transfer physics to affect the zone temperature. The zone temperature may then be measured by the controller. The measured zone temperature then may lead to a change in the sensible cooling load on the zone, and then the overall process may repeat.

The overall architecture of the DNN model may mathematically partition the overall state x of the system into substates $x^c$ for the controller and $x^p$ for the physics, each with corresponding outputs $y^c$ and $y^p$. The inputs u may largely be shared by both sub-models. In some embodiments, the general prediction structure of the DNN model is:

$$x_{k+1}^c = f^c(x_k^c, y_k^c, y_k^p, u_{t+k})$$

$$y_k^c = h^c(x_k^c)$$

$$x_{k+1}^p = f^p(x_k^p, y_{k+1}^c, y_{k+1}^c, u_{t+k})$$

$$y_k^p = h^p(x_k^p)$$

where f(·) and h(·) are state-space prediction models, and c and p denote prediction models for the controller and physics, respectively, and t and k represents time instances or intervals. The presence of $y_k^c$ as an argument to $f^c(\cdot)$ and $y_k^p$ as an argument to $f^p(\cdot)$ is for state-estimation purposes. By contrast, the presence of $y_k^p$ in $f^c(\cdot)$ and $y_{k+1}^c$ in $f^p(\cdot)$ may facilitate the appropriate interaction between sub-models of the DNN model architecture. The current output of the physics sub-model, the zone temperature, may be an input to the controller sub-model. In some embodiments, the controller sub-model may then output the next predicted output, such as the average zone heating and cooling duties over a current interval, which may then be used as inputs to the physics sub-model. The composite output $y_k$ of the prediction system may then be created by joining $y_k^c$ and $y_k^p$ in the appropriate order. In some embodiments, the filtered sub-models of the DNN model may include the current prediction error as an additional input.

For state estimation, the oldest state may be chosen as an affine transformation of the oldest measurement $y_{t-N}$, similar to the approach in the system identification prediction. However, the coefficients of the transformation may be decision variables rather than fixed values. In some embodiments, $f^c(\cdot)$ and $f^p(\cdot)$ are then iterated through the past data, except that all values of $y_k^c$ and $y_k^p$ are the known past values from components of $y_{t+k}$. As such, during the filtering steps of the DNN model, there may be no interactions between the two sub-models. In some embodiments, the sub-models are in innovations-form and as such, the predicted outputs have no effect on updated states of the sub-models. Therefore, those connections are not shown in the overall estimation and prediction structure of the DNN model.

The DNN model may be trained such that each sub-model is trained separately for fifteen epochs. In some embodiments, the outputs from the opposite sub-models are directly taken from the training data. Therefore, the training processes of the sub-models may be completely independent. In some embodiments, the controller sub-model is trained using only excitation data from training data that contains both excitation and conventional training data. The physics sub-model may be trained using both excitation training data and conventional training data. After initial training of the sub-models separately, the sub-models are combined and additional epochs of training may be performed. The future y values may now be used as the output of the opposite sub-models, such as when making future predictions. Thus, the additional training steps may allow the sub-models to correct for any biases in the predictions of the other, separate sub-models. In some embodiments, weights may be saved for several best epochs during training in terms of mean squared error on the entire training dataset. With thirteen weeks of training data, the training of DNN model may take roughly two and a half hours.

In some embodiments, the DNN model may have a hierarchical model structure. Similar to the structured DNN model, the hierarchical DNN model may also use two separate sub-models based on the structure of the system. However, rather than decompose the physics and regulatory control, the DNN model may decompose the zones and the AHU that serves the zones. In particular, the zone sub-model may predict zone temperature and airflow from temperature setpoints, while the AHU sub-model may use the predicted flows and temperatures to calculate cooling duty and fan power. Hence, the DNN model is a hierarchical DNN model because the predictions flow upward from the lower level (zones sub-models) to the higher level (the AHU sub-models).

In some embodiments, both the zone sub-models and the AHU sub-models have the same structure. The structure of both the zone and the AHU sub-models may consist of two connected LSTMs that perform state estimation and prediction, respectively. The first LSTM, which is referred to as the "encoder", may take the values of past u and y as inputs at each timestep. After iterating over all of the past timesteps, the internal states of the encoder may then be used as the initial states of the second LSTM, which is referred to as the "decoder". For each timestep in the "decoder", the LSTM may also receive u and y as inputs. However, they values may now be the predictions made at the previous timestep. In some embodiments, filtering in the DNN model is completely in parallel, but during prediction, the zone sub-model outputs may be inputs to the AHU sub-model.

The structure of the zone and AHU sub-models may use $x_t^{ij}$ to denote the internal LSTM states, with $i \in \{a, z\}$ for the AHU and zone sub-models, and $j \in \{e, d\}$ for the encoder or decoder. Both of the encoders may operate completely in parallel. In some embodiments, particularly, $$x_{k+1}^{ie} = f_{LSTM}^{ie}(x_k^{ie}, u_k, y_k)$$

where the oldest state (e.g., time t−N, which corresponds to k=0) is initialized to zero. The two encoders in the structure of the DNN model may not directly interact. By contrast, for the decoders, the structure may be $$x_{k+1}^{zd} = f_{LSTM}^{zd}(x_k^{zd}, u_k, \hat{y}_y^{zd})$$

$$y_{k+1}^{zd} = h_{LSTM}^{zd}(x_{k+1}^{zd})$$

$$x_{k+1}^{ad} = f_{LSTM}^{ad}(x_k^{ad}, u_k, \hat{y}_{k+1}^{zd}, \hat{y}_k^{ad})$$

$$y_{k+1}^{ad} = h_{LSTM}^{ad}(x_{k+1}^{ad})$$

In some embodiments, all the LSTMs are in standard form, meaning that all of the u and y function arguments may be treated the same. The initial conditions can include:

$$x_0^{ie} = 0, x_0^{id} = x_N^{ie}, \hat{y}_0^{id} = y_{96}$$

Each of the encoder states may be initialized to zero. In some embodiments, the value of the encoder states after processing N timesteps of past data is used as the initial encoder state. In a similar manner, the initial "predicted" outputs may use the most recent measurement (i.e., the final element in $Y^p$). The overall DNN model outputs $\hat{y}_k$ are the appropriate concatenation of $y_k^{zd}$ and $y_k^{zd}$. In some embodiments, all four LSTMs in the DNN model have 50 units, meaning that each state $x^{ij}$ has 100 vector components. In other embodiments, the LSTMs in the DNN model may contain more or less units, with the corresponding state $x^{ij}$ having more or less vector components.

In some embodiments, the zone sub-model outputs include both zone temperature and VAV airflow, which are components of y and z respectively for the overall prediction system of the DNN model. Therefore, the past data inputs may include z and y, but only the relevant values of z (i.e., VAV airflow) may be used. The other values of z may be ignored. In some embodiments, the airflow predictions are not necessary predictions, and therefore may be discarded after being used by the AHU decoder. As such, only the zone temperature prediction may be included in the composite $\hat{y}_k$. The outputs of the AHU sub-model may include energy consumption terms, such as fan power and heating and cooling coil loads, all of which may be included in the composite output of the DNN model.

During training of the DNN model, each encoder and decoder pair may be trained in isolation using real data for all of the y inputs. In particular, during training, all of the decoder inputs $\hat{y}_k^{id}$ may be received from sample training data. As such, the future predictions of the decoder may be dynamically forced by the known values. Therefore, during training, the encoder and decoder may have the same input and output structure, in which all inputs may be taken from known measurements, and the only unknown quantities may be the internal states. In some embodiments, both models are trained for fifty epochs, taking the weights at the end of the last epoch as the trained DNN model. Using thirteen weeks of training data, the training of the DNN model may take approximately 2.7 hours.

In some embodiments, the DNN model may be configured as monolithic model structure. In some embodiments, the monolithic DNN model uses a single LSTM encoder and decoder pair to make each prediction. As such, the structure of the monolithic DNN model may be similar to the structure of the zone sub-model used in the structured DNN model. As before, a state $x_k^e$ is associated with the encoder and a state $x_k^d$ is associated with the decoder. These two states in the monolithic DNN model may evolve as:

$$x_{k+1}^e = f_{LSTM}^e(x_k^d, u_k, y_{k+1}, z_{k+1})$$

$$x_{k+1}^d = f_{LSTM}^d(x_k^d, u_k)$$

$$\hat{y}_k = h_{LSTM}^d(x_k^d)$$

Therefore, the encoder may take all known values as inputs, while the decoder may take only $u_t$ as inputs.

In some embodiments, the offset, time indexing for u and {y, z} may be chosen such that the oldest measurement may be discarded. The output predictions of the decoder may not be fed back as inputs at the next timestep, since $\hat{y}_k$ is a linear transformation of $x_k^d$. The encoder may receive additional inputs as compared to the inputs received by the decoder. Therefore, the encoder may need a larger state to remember a sufficient amount of past information. Accordingly, the final encoder states may be passed through an affine transformation function $\mathcal{T}(\cdot)$ to obtain the initial decoder states, i.e., $$x_0^d = \mathcal{T}(x_N^e)$$

The matrix and vector that define $\mathcal{T}(\cdot)$ can be trainable parameters. In other embodiments, the encoder and decoder states have the same dimensions, and therefore the extra transformation may be unnecessary. The encoder initial state $x_0^e$ may also be a trainable parameter, and thus it may be held constant across all samples. In some embodiments, $x_0^e$ is chosen as an affine transformation of $y_{t-N}$.

Herein, any training data, experience data, or measured data (such as that received from an HVAC system) can include timeseries data. A timeseries can include a series of values for the same point and a timestamp for each of the data values. For example, a timeseries for a point provided by a temperature sensor can include a series of temperature values measured by the temperature sensor and the corresponding times at which the temperature values were measured. An example of a timeseries which can be generated is as follows:

[<key, timestamp1, value1>, <key, timestamp2, value2>, <key, timestamp3, value3>]

where key is an identifier of the source of the raw data samples (e.g., timeseries ID, sensor ID, device ID, etc.), timestamp$_i$ may identify the time at which the ith sample was collected, and value$_i$ may indicate the value of the ith sample. Time series data may allow modeling systems or analytic systems to correlate data in time and identify data trends over time for either model training or execution.

Additional methods and systems for generating experience data and for training predictive models can be found in U.S. Patent Application No. 62/844,660 filed May 7, 2019, which is incorporated by reference in its entirety herein.

Training a Reinforcement Learning Model for HVAC Control

Referring now to FIG. 6, a block diagram of a training system 600 for training a RL model using simulated and real experience data is shown. Training system 600 includes a predictive modeler 602 that generates simulated experience data and stores the simulated experience data in simulated experience storage 604, a RL model 606, a RL trainer 608 to optimize RL model 606, an HVAC controller 610 that controls HVAC system 612 using the RL model 606, generates real experience data from the actual operation of HVAC system 612, and stores the real experience data in real experience storage 614. Predictive modeler 602, RL trainer 608, and controller 610 may be implemented as one or more computing devices. Data storages 604 and 614 may be any storage device, such as a database, data buffer, or other memory device. Training system 600 is generally configured to initially train RL model 606 for HVAC control using simulated experience data 610, and improve the RL model 606 over time using the real experience data from HVAC system 612.

Predictive modeler 602 generates simulated experience data to train the RL model 606. Predictive modeler 602 can include one or more dynamic models to generate the simulated experience data. Predictive modeler 602 may receive initial data samples as input for generating the simulated experience data. Simulated experience data can be stored in simulated experience storage 604 by predictive modeler 602.

In some embodiments, the dynamic model of predictive modeler 602 includes a calibrated simulation model to generate the simulated experience data. In some embodiments, the calibrated simulation model may be modeled in an EnergyPlus™, Python, or Simscape simulation program. Calibrated simulation models generally use multiple data inputs to simulate how system behavior will determine state changes and rewards over a time interval. Data inputs could include, but are not limited to, predicted weather patterns, energy rates, system efficiencies, environmental dynamics, occupancy data, equipment models, and other simulation data. The simulation model can use the data inputs to generate predicted results, such as future states of the system and cost savings. In some embodiments, the simulation model generates a predicted optimal control for any number of system states, such that subsequent RL training and can use the predicted optimal control for initial training. Given the complexity of analysis, simulation models can generally produce more accurate simulated experience data than other dynamic models.

In some embodiments, the dynamic model of predictive modeler 602 is a surrogate model, which may include a deep neural network (DNN) model of HVAC dynamics. Surrogate models are generally designed to simulate how a particular system may react to a given input. The surrogate model can include a DNN of any configuration, such as a convolution neural network (CNN), recurrent neural network (RNN), long short term memory (LSTM) architecture, LSTM sequence-to-sequence (LSTM-S2S) framework, or a gated recurrent unit (GRU). In some embodiments, the surrogate model may be trained by data generated by a calibrated simulation model so as to optimize the weights used in the edges and nodes of the neural network. The surrogate model may receive sample data as input in the neural network to predict resultant states and rewards. Surrogate models may generally produce simulated experience data faster than other dynamic models. Surrogate models can be retrained over time to produce more accurate results, which will be discussed in further detail in regards to FIG. 9.

In some embodiments, a simulation model is used to train a surrogate model, wherein the surrogate model is used to generate simulated experience data for training RL model 606. In some embodiments, both a simulation model and a surrogate model are used to generate simulated experience data for training RL model 606. In such embodiments, the output of the surrogate model and the simulation model may be reformatted such that the outputs can be used or stored together.

Referring still to FIG. 6, RL model 606 can be one or more of a variety of RL models used to control HVAC system 612. RL model 606 can be trained by RL trainer 608 using simulated or real experience data. RL model 606 is generally configured to receive a current state of the HVAC system 612 and determine an action for the HVAC system to perform based on the current state. RL model 606 can be a deterministic model (i.e., for any input, the model determines an output) or a stochastic model (i.e., outputs the possibility of an action being performed).

RL model 606 can define a plurality of states. In some embodiments, the plurality of states can each be defined to include one or more of a system setpoint, current temperature measurement, occupancy data, weather data, or any other endogenous or exogenous parameters discussed herein. A future state may be defined as the state of HVAC system 612 after a pre-determined time interval. In some embodiments, the time interval is based on a frequency to update control parameters (e.g., every minute, hour, day, etc.). In some embodiments, the time period is based on the time day (e.g., before working hours, during the work day, after the work day, etc.). In some embodiments, the pre-determined time interval is based on how often control signals are sent to the HVAC system 612 using the RL model 606.

RL model 606 may also define a plurality of actions that HVAC system 612 may perform. In some embodiments, the RL model 606 may define each action based on a vector of control parameters, such as one or more of a system setpoint, operational condition, power consumption, pre-cooling sequence, or other control parameter. Actions defined by RL model 606 can be used by RL controller 610 to generate control signals for HVAC system 612.

RL model 606 may also define a reward function that defines a value for entering a state. The reward function may be based on the current state of the system. In some embodiments, the reward function may be based on both the current state of the system and the action performed in the current state. In some embodiments, the reward function is a look-up table of reward values for a state or state-action pair. In some embodiments, the reward function is an efficiency or cost function based on the current state or action parameters.

In some embodiments, RL model 606 is a Q-Learning model. A Q-Learning model generates a Q value for a given state and action (i.e., a state-action pair) that represents the short-term and long-term value of performing the action in the given state. In some embodiments, the Q-Learning model may use a lookup table to determine a Q value for the state-action pair. The Q table may be updated based on training data to adjust the Q values for each state-action pair. In some embodiments, the Q-Learning model is a deep Q-Learning model wherein the model uses a neural network (e.g., a DNN, CNN, etc.) to generate a Q value for the given state-action pair input. The neural network may contain one or more hidden layers. The weights of the neural network may be updated based on a backpropagation algorithm using training data.

In some embodiments, RL model 606 is a policy gradient model. A policy gradient may generally determine a vector of actions or action parameters based on an input state, wherein the values of the vector determine what likelihood an action may be performed in a state. The values of the policy gradient may then be used by a controller to determine which action or actions to perform while in the current state. In some embodiments, a policy gradient may uses a neural network to generate the policy gradient for a given input state, wherein the weights of edges or nodes in the neural network are updated by a backpropagation algorithm.

In some embodiments, RL model 606 may be configured to extend the RL model to estimate the preferred action to perform for previously unseen or untested states. For example, in embodiments wherein the RL model 606 comprises a neural network, the neural network can be used to generate control values for inputs not used to train the neural network, despite not having been trained using a particular input state or input action.

RL model 606 may be configured in some embodiments with quantized states or actions. Quantized states may reduce the complexity of the input space (i.e., number of states, number of potential actions, etc.). Quantization may be defined by the structure of RL model 606. In some embodiments, quantized states can be defined by a statistical function to divide an input space into regions.

Still referring to FIG. 6, RL trainer 608 trains RL model 606 using simulated experience data and real experience data. RL trainer 608 can initialize the RL model 606 using simulated experience data generated by predictive modeler 602. RL trainer 606 may also be configured to use real experience data or simulated experience data to retrain the RL model 606 after a period of time. RL trainer 608 may retrieve real experience data from real experience storage 614 and the simulated experience data from simulated experience storage 604. Retraining RL model 606 may include adjusting the pre-existing model based on a learning rate. In some embodiments, RL trainer 608 may also be configured to reinitialize the weighted values of the RL model 606 and train a new RL model 606.

RL trainer 608 may be configured to determine whether the RL model 606 should be retrained. In some embodiments, RL trainer 604 is configured to retrain RL model 606 after a regular time interval, such as, for example, every week, month, or year. In some embodiments, RL trainer 604 is configured to retrain RL model 606 on an exponential curve, such that the RL model 606 is trained less often as time progresses. In some embodiments, RL trainer 608 is configured to retrain the RL model 606 after a number of real experience data samples are collected from HVAC system 612. In some embodiments, RL model 606 is configured to retrain RL model 606 in response to a user input.

Still referring to FIG. 6, HVAC system 612 is controlled by HVAC controller 610. Controller 610 may receive sensor and operational data from HVAC system 612 and input the received data into the RL model 606. In some embodiments, controller 610 formats the received data such that the real experience data can be stored in real experience storage 614 for future RL model training. Controller 610 can generate control signals based on the output of the RL model 606 and send to the HVAC system 612 to alter an operational state. In some embodiments, controller 610 is configured within HVAC system 612. In some embodiments, controller 610 is configured to communicate with a processing circuit or equipment within HVAC system 612 via, for example, a building network. In some embodiments, controller 610 is configured within a BMS. In some embodiments, controller 610 controls HVAC system 612 using an ε-greedy policy, wherein probabilistically the controller 610 deviations from a target control policy and performs a random or pseudo-random action.

HVAC system 612 may be the HVAC 100. HVAC system 612 can be configured to report sensor measurements, setpoints, operating conditions, or power consumption to RL model 606. Controller 610 may be configured to use the received information to determine a current state of the HVAC system 612 for input into the RL model 606. HVAC system 612 can receive one or more instructions from controller 610 to vary one or more parameters of controlling HVAC system 612. For example, the received instruction may comprise a new setpoint for the system or control instructions for a subcomponent of HVAC system 612. In some embodiments, HVAC system 612 may be configured to generate real experience data and store the real experience data in the real experience data storage 614.

In some embodiments, at least one of HVAC system 612 and controller 610 may be included within a BMS, such as BMS 400, wherein the BMS can report additional information regarding operation of the HVAC system 612 to the controller 610, such as, but not limited to, occupant feedback, weather conditions, expected occupancy trends, or other data collected, generated, or analyzed by the BMS.

In some embodiments, training system 600 can be configured to generate or collect initial real experience data responsive to actual operation of the HVAC system during an offline period of time. The offline period may be before the online operation of the HVAC system or otherwise under control of the trained RL model. The offline period may be a short time period relative to a time period over which the HVAC system operates in an online time period (e.g., a day, week, month). The initial real experience data may be generated responsive to random control actions of the HVAC system. In some embodiments, the RL trainer 608 may be configured to initialize the RL model 606 to generate the random control actions before later being trained using simulated experience data. Controller 610 may be configured to collect or generate the initial real experience data. RL trainer 608 or predictive modeler 602 may be configured to train the RL model 606 or a surrogate model, respectively, using the initial real experience data in addition to or in the alternative to the other training data discussed herein, such as simulated experience data or data generated from the calibrated simulation model. Using the initial real experience data may improve initial training of the RL model or surrogate model by supplementing the simulated experience data with a small amount of real experience data.

Referring generally to FIG. 7, several configurations of RL trainer 608 are shown, according to various embodiments. RL trainer 608 is configured to train and retrain RL model 606. RL model 606 may be initialized by RL trainer 608. In some embodiments, RL model 606 is initialized by another component of an RL modeler. Initialization of the RL model 606 generally includes configuring the input domain space, the various value functions or matrices, and training parameters of an RL model.

To train the RL model 606, the simulated experience data stored in the simulated experience storage 604 is sampled by the RL trainer 608 for training data. The RL trainer can sample the storage according to any sampling method. In some embodiments, the storage may be randomly sampled. In some embodiments, the storage is sampled based on error measurements, such as the Bellman gap value for an experience data sample. In some embodiments, specific samples are chosen based on knowledge of the domain, such as, for example, the maximum, minimum, mean, or standard deviation of one or more values of the experience data. In some embodiments, the storage is sampled such that experience data with low probability is chosen to offset data imbalance.

For each experience data sample, the RL model generates an output to determine which action to perform. Once the output of RL model 606 is generated, the output is compared to the expected output associated with the sampled experience data. The comparison is used by RL trainer 608 to adjust the values of RL model 606 such that the model produces outputs closer to the expected output for the same input.

After the model has been updated, RL trainer 608 may determine whether additional experience data samples should be used to continue training the RL model 606. In some embodiments, RL trainer 608 may be configured to use a pre-defined number of experience samples to train the RL model 606. In some embodiments, RL trainer 608 may be configured to calculate an accumulated Bellman gap value as a measure of optimization of the RL model 606, and terminate training when the accumulated Bellman gap value surpasses a predefined threshold value. In some embodiments, the RL trainer 608 determines if the model has been trained using a well distributed exploration space, and may choose subsequent experience samples to offset the imbalance of the exploration space.

In embodiments where the RL model 606 is a Q-Learning model, a Q value is generated by the RL model 606 based on the input state and input action of the sampled experience data. The Q function of the RL model 606 can be trained according to the equation:

$$Q_{new}(s, a) = (1 - \alpha(t)) * Q(s, a) + \alpha(t) * \left(r + \gamma * \max_{a'} Q(s', a')\right)$$

where s is the current state, a is the current action, $Q_{new}$ is the new Q value for the state-action pair (s,a), $\alpha(t)$ is the dynamic learning rate as a function of time step t, s' is the future state after performing action a at state s, r is the reward for performing action a at state s, γ is the discount rate of future rewards, and $$\max_{a'} Q(s', a')$$

is the maximum Q value for all possible actions a' in state s'. By dividing the training processing into a series of sub problems, training a Q-Learning model converges the model to an minimum-cost function once a variety of inputs have been tested and retested.

For embodiments where the RL model is a deep reinforcement learning model, such as a deep Q-Learning model, the RL model may be initialized as a deep neural network, in which experience data is received as input into the model and a Q value for the input experience data is generated as the output. The Q function neural network may be trained using backpropagation to train weights of the network such that the Q function produces more accurate outputs to the expected output. The ideal Q value Q* may be calculated as:

$$Q^*(s, a) = r + \gamma * \max_{a'} Q(s', a')$$

where s is the current state, a is the current action, s' is the future state after performing action a at state s, r is the reward for performing action a at state s, γ is the discount rate of future rewards, and $$\max_{a'} Q(s', a')$$

is the maximum Q value for all possible actions a' in state s'. The backpropagation algorithm can then minimize the error:

$$e = \Sigma_{i=1}^{N} \|Q_i - Q_i^*\|$$

where e is the total model error over N experience data samples, $Q_i$ is the output Q value for an input sample i, and $Q_i^*$ is the ideal output for input sample i.

In embodiments where the RL model 606 is a policy gradient model, the current state of the sampled experience data is input into RL model 606 to generate an action vector. The action vector can be compared to the expected action for a given state in the sampled experience data. The policy gradient may be represented as a neural network, and may use a gradient backpropagation method according to the equation:

$$\nabla_\theta J(\theta) = \sum_{m=1}^{M} \sum_{t=0}^{T} (Q_\theta^\pi(s_t, a_t) - V_\theta^\pi(s_t)) * \nabla_\theta \log \pi_\theta(a_t \mid s_t)$$

where $J(\theta)$ is the expected rewards, T is the number of states considered in a policy gradient trajectory, with t as the iterative variable over the trajectory, M is the number of samples considered with m as the iterative variable, $Q_\theta^\pi(s_t, a_t) - V_\theta^\pi(s_t)$ defines the reward of taking action $a_t$ in state $s_t$ (with $Q_\theta^\pi$ being a Q function of future projected value, and $V_\theta^\pi$ being a value function of the current state). Using the gradient of $J(\theta)$, the reward function can be maximized to derive an actionable policy for a given state or trajectory of states and actions.

Once the RL trainer 608 has satisfied the stop condition for training, the RL model 606 can be used by controller 610 to control HVAC system 612. In controlling HVAC system 612, controller 610 receives state information from HVAC system 612, inputs the state or potential action into the RL model 606, and sends a control action based on the determined output of RL model 606. As controller 610 operates and controls the action of HVAC system 612, real experience data is generated. The RL trainer can then determine whether the RL model 606 should be retrained using the real experience data or simulated experience data.

Figure 7A:
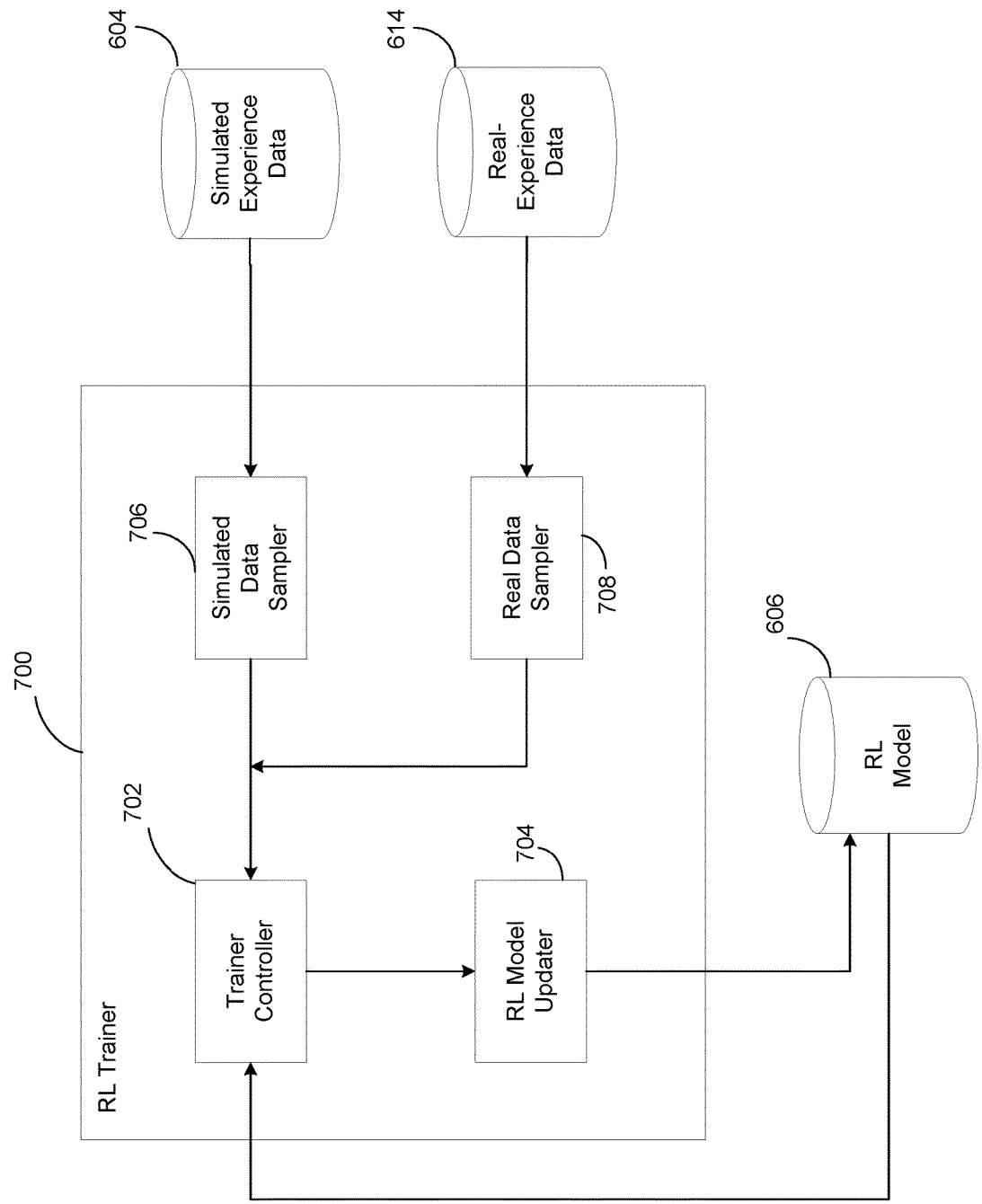
FIG. 7A-B are block diagrams of a reinforcement learning model trainer, according to various embodiments.

In FIG. 7A, one embodiment of a RL trainer 700 is shown to include a training controller 702, RL model updater 704, simulated-data sampler 706, and measured-data sampler 708. RL trainer 608 is configured to determine when RL model 606 should be retrained, gather training data from the real and simulated experience storages 614 and 604, and update the RL model 606.

Training controller 702 can be configured to determine when to retrain RL model 606. In some embodiments, training controller 702 trains RL model 606 responsive to receiving a user input. In some embodiments, training controller 702 trains RL model 606 responsive to receiving a control signal from another computing device, such as a server in BMS 400. In some embodiments, training controller 702 may be configured to retrain the RL model 606 after a period of time or number of generated real experience data points. For example, training controller 702 may be configured to retrain the RL model 606 every day, month, or year. In another example, training controller 702 retrains the RL model 606 after a predetermined number of real experience data points are generated. In some embodiments, the training controller 702 is configured to retrain the RL model 606 according to an exponential curve, such that the model is trained more often during the initial phase of operation, and trained less often as time progresses.

In some embodiments, training controller 702 maintains one or more dynamic probability functions to determine when to retrain the RL model 606. For example, training controller 702 may be configured to perform a uniform random number generator algorithm once a day, and responsive to the random number output exceeding a threshold value, initiate a sequence of commands to retrain the RL model. In some embodiments, two different probabilistic controls are maintained separately for the simulated experience data and measured experience data, such as by using different dynamic probability functions or threshold values. Accordingly, execution of the probabilistic controls by training controller 702 enable training controller 702 to determine whether the RL model should be retrained using simulated experience data 604, retrained using measured experience data 614, or retrained using both simulated experience data 604 and measured experience data 614.

RL trainer 700 also comprises simulated-data sampler 706 and real-data sampler 708. Simulated-data sampler 706 is configured to sample a simulated experience data point from simulated experience data storage 604. Real-data sampler 708 is configured to sample a measured experience data point from simulated experience data storage 614. Samplers 706 and 708 may be configured within the same or separate modules. Samplers 706 and 708 sample their respective storage devices according to a sampling function. In some embodiments, samplers 706 or 708 can be configured to randomly sample experience data from the respective storages. In some embodiments, samplers 706 or 708 can be configured to sample based on domain knowledge. In some embodiments, samplers 706 or 708 can be configured to sample experience data based on a Bellman gap calculation. In some embodiments, samplers 706 or 708 can be configured to sample experience data based on previous sampled values to offset data imbalance. In some embodiments, samplers 706 or 708 can be configured to sample experience data based on approximated surrogate model error.

RL trainer 700 also comprises RL model updater 704 generally uses information received from training controller 702 to update one or more values in the RL model 606. In one embodiment, updater 704 receives an error measurement for a sampled experience data point from training controller 702. Updater 704 uses the error measurement to update one or more values of the RL model 606.

In some embodiments, training controller 702 sends a signal to either the simulated-data sampler 706 or the real-data sampler 708 to sample an experience data point. Training controller 702, responsive to receiving the sampled experience data point, inputs at least part of the experience data point into RL model 606. Training controller 702 can receive the output value of the RL model 606 responsive to the training controller 702 inputting the at least part of the experience data point into RL model 606.

Responsive to the indication that the RL model 606 should be trained, RL trainer 608 executes a series of instructions to train the RL model 606. In some embodiments, training controller 702 signals simulated data sampler to sample an experience data point.

Figure 7B:
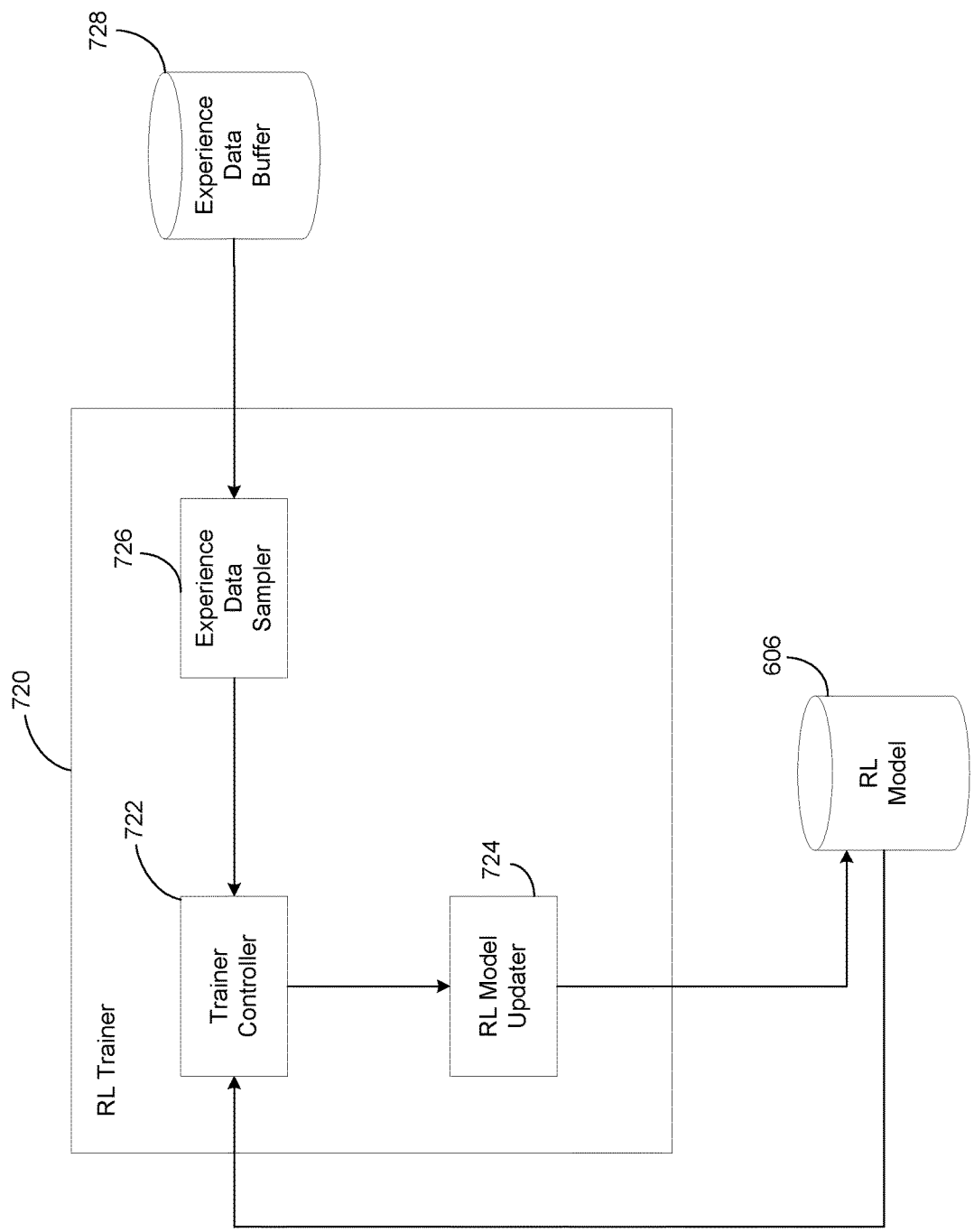

Referring now to FIG. 7B, another configuration of a RL trainer 720 is shown. RL trainer 720 is shown to include training controller 722, RL model updater 724, and experience data sampler 726. In some such embodiments, the experience data sampler 726 samples both the simulated experience data storage 604 and the real experience data storage 614 such that both simulated and real experience data is represented in the training data. In some embodiments, the simulated experience data storage 604 and the real experience data storage 614 are combined into a single storage database 728 such that the RL trainer 720 samples both real and simulated experience data from the same storage location.

Training controller 722 can include any configuration or function as described in relation to training controller 702.

Training controller 722 may generally determine whether to retrain the RL model 606. Training controller 722 may send an indication to experience data sampler 726 to sample one or more experience data samples from experience data storage 728. Training controller 722 may be configured to receive training data from experience data sampler 726 and input the training data into the RL model 606 to generate output states and rewards. Training controller 722 may send output states and rewards to data RL model updater 724 to update one or more values in the RL model 606 based on the output state or expected reward.

Experience data sampler 726 can include any configuration or function as described in relation to simulated data sampler 706 and real data sampler 708. Experience data sampler 726 may be configured to sample data from experience data storage 728. Experience data sampler 726 may use any sampling criteria as described in regard to samplers 706 and 708. In some embodiments, experience data sampler 726 may be configured to prioritize real experience data samples over simulated experience data samples when sampling training data.

RL model updater 724 may include any configuration or function as described in relation to RL model updater 704. RL model updater 724 may be configured to update one or more values of RL model 606 based on the output of RL model 606 with input of training data. RL model updater 724 may use an error measurement between an expected output associated with samples of the training data and the output values from RL model 606. RL model updater 724 may be configured to update the values of the RL model 606 based on whether the training data sample is simulated or real experience data. In some embodiments, the magnitude of which the one or more values of the RL model are changed is based on how many data samples have been previously used to train the RL model 606. In some such embodiments, RL model updater 724 maintains a learning rate parameter that decreases over time. In some embodiments, a separate learning rate is used for each of simulated experience data and real experience data.

Figure 8:
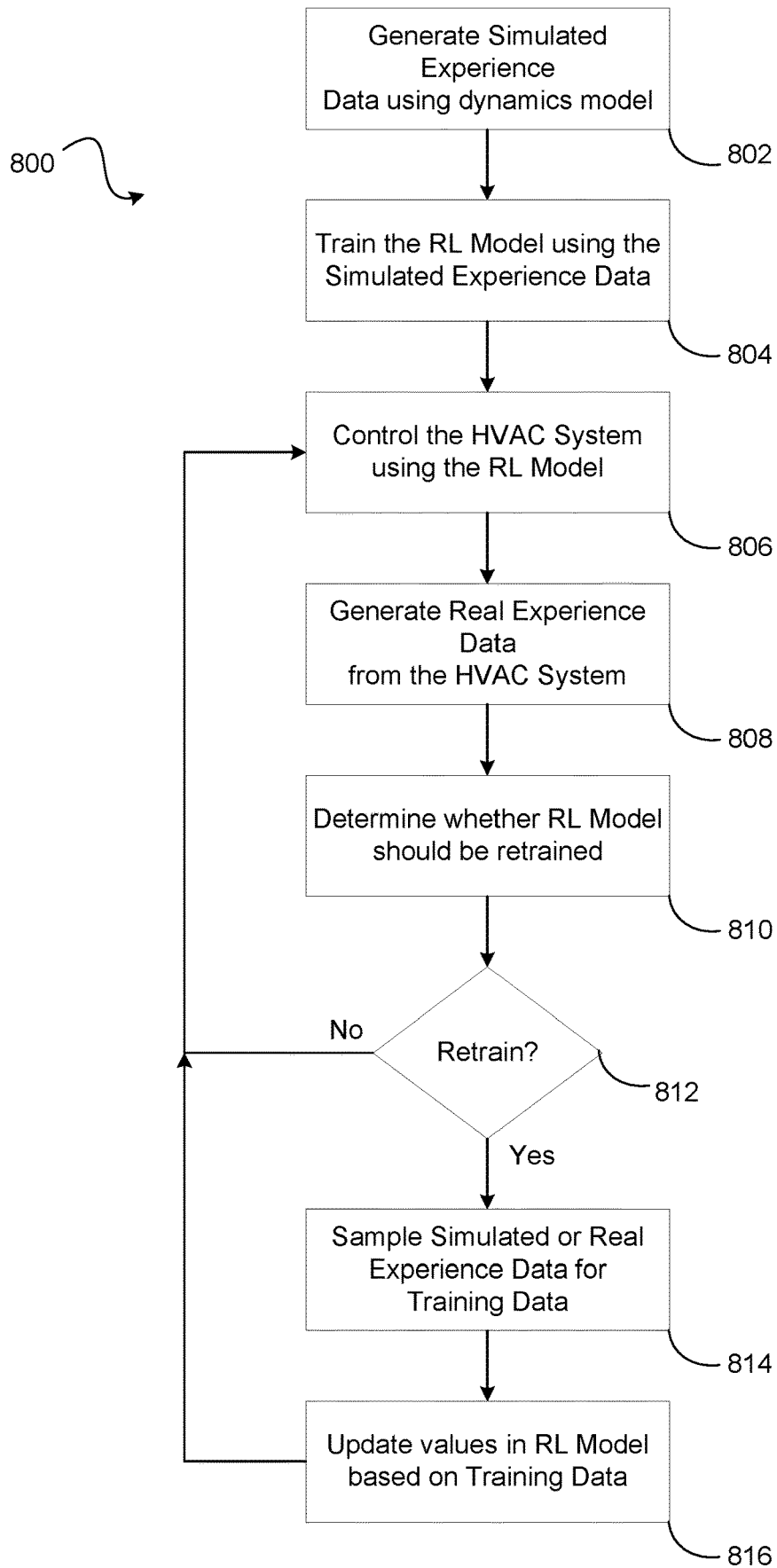
FIG. 8 is a flow diagram for training a reinforcement learning model using simulated and real experience data, according to some embodiments.

Referring now to FIG. 8, a flow diagram 800 is shown for training a RL model using simulated and real experience data. In some embodiments, the steps of flow diagram 800 may be performed by one or more computing devices, such as the various components of training system 600, to train the RL model for control of an HVAC system.

At 802, simulated experience data is generated using a dynamics model of a building. In some embodiments, the simulated experience data is generated by predictive modeler 602. In some embodiments, simulated experience data may generally include a state-action pair, an expected future state, and a reward for taking the action at the state. The dynamics model may be, for example, a calibrated simulation model or a surrogate model of the building, such as a neural network. In some embodiments, both a calibrated simulation model and a surrogate model can be used to generate the simulated experience data. Simulated experience data may be stored in a storage database, such as simulated experience data storage 604. Alternatively, in some embodiments, simulated experience data is received from an external device. Simulated experience data may be retrieved from a database or storage device. Simulated experience data may be received from an external computing device that generates or collects the simulated experience data. Received simulated experience data may be the same as or include any of the features as described with the generated simulated experience data.

At 804, a RL model is trained using the simulated experience data. The RL model may be RL model 606. The RL model be trained by RL trainer 608. In some embodiments, training the RL model at 804 using the simulated experience data may be an offline training (i.e., before operation of the building equipment within the building). Training the RL model generally configures the various parameters of the RL model to generate a preferred action responsive to an input state. The use of simulated experience data to perform offline training of the RL model allows for a larger amount of training data as compared to available real experience data such that the RL model can be used to control the HVAC system before an adequate amount of real experience data has been collected to train the RL model.

At 806, the HVAC system is controlled using the RL model. The HVAC system may be any of the systems or devices discussed herein, such as HVAC system 100 or HVAC system 612. The HVAC system may be controlled by a controller, such as controller 610. The HVAC system is generally configured to send sensor and operational data to the controller such that the controller can determine a state in which the HVAC system is currently operating. The controller can input at least the current state into the RL model to determine the preferred action to control the HVAC system in the current state. The controller can then send one or more control signals or instructions to the HVAC system to affect the operating condition of the HVAC system.

At 808, real experience data is generated from the HVAC system. In some embodiments, real experience data may be generated or formatted by controller 610 or HVAC system 612, or another processing circuit. Real experience data is generated responsive to operation of HVAC system 612. In some embodiments, the real experience data is generated responsive to control actions determined using the RL model. Real experience data may include a performed state-action pair of the HVAC system, a future state resultant of the action performed in the previous state, and a measurement of a reward or incentive for taking the performed action in the state. The generated real experience data may be stored in a storage device with previously captured real experience data. In some embodiments, real experience data is generated periodically, rather than responsive to each control action.

At 810, a determination of whether to retrain the RL model is made. In some embodiments, the determination may be based on a probabilistic threshold, wherein a random value is generated and compared to a set threshold, and responsive to the random value exceeding the threshold, the RL model is retrained; otherwise, the RL model is not retrained. In some embodiments, the determination may be based on a number of real experience data points collected, wherein the RL model is retrained responsive to a counter exceeding the predefined number of collected points. In some such embodiments, the number of collected points varies with time such that as time goes on the number of collected points required to retrain the RL model increases. In some embodiments, the determination may be based on a period of time, such that the RL model is retrained after the expiration of the period of time. In some such embodiments, the period of time increases over time such that the RL model is retrained less often over time. In some embodiments, two separate determinations may be made to retrain the RL model using simulated experience data and to retrain the RL model using real experience data. In some embodiments, the determination is made periodically rather than responsive to each determined control action.

If the determination at 810 is to not retrain the RL model, the system continues to control the HVAC system at 808 using the RL model and generating more real experience data. If the determination at 810 is to retrain the RL model, execution of the retraining algorithm begins at 814 by sampling training data. Sampling training data may include selecting one or more data points from an experience database. Sampling training data may be performed by any of samplers 706, 708, or 726. Sampled training data may comprise at least one of the simulated experience data or real experience data. Sampling training data may be performed randomly on experience data. In some embodiments, sampling training data may be based on previously used training data. In some embodiments, sampling training data may prioritize real experience data. In some embodiments, sampling training data may be based on the time at which a data point was collected.

At 816, the values of the RL model are updated based on the sampled training data. In some embodiments, the RL model is updated by RL model updater 704 or 724. In some embodiments, The RL model is updated by a gradient decent algorithm. In some embodiments, the RL model is updated based on an error measurement between the expected output and the generated output of the RL model. In some embodiments, the RL model is updated using a backpropagation algorithm. One or more values of the RL model may be changed as a result of the update. After completion of the update of the RL model, the controller resumes control of the HVAC system at 806 using the updated RL model. In some embodiments, the likelihood of retraining the RL model at 810 is decreased after each time the RL model is updated.

Retraining a Reinforcement Learning Model Using a Retrained Surrogate Model

Figure 9:
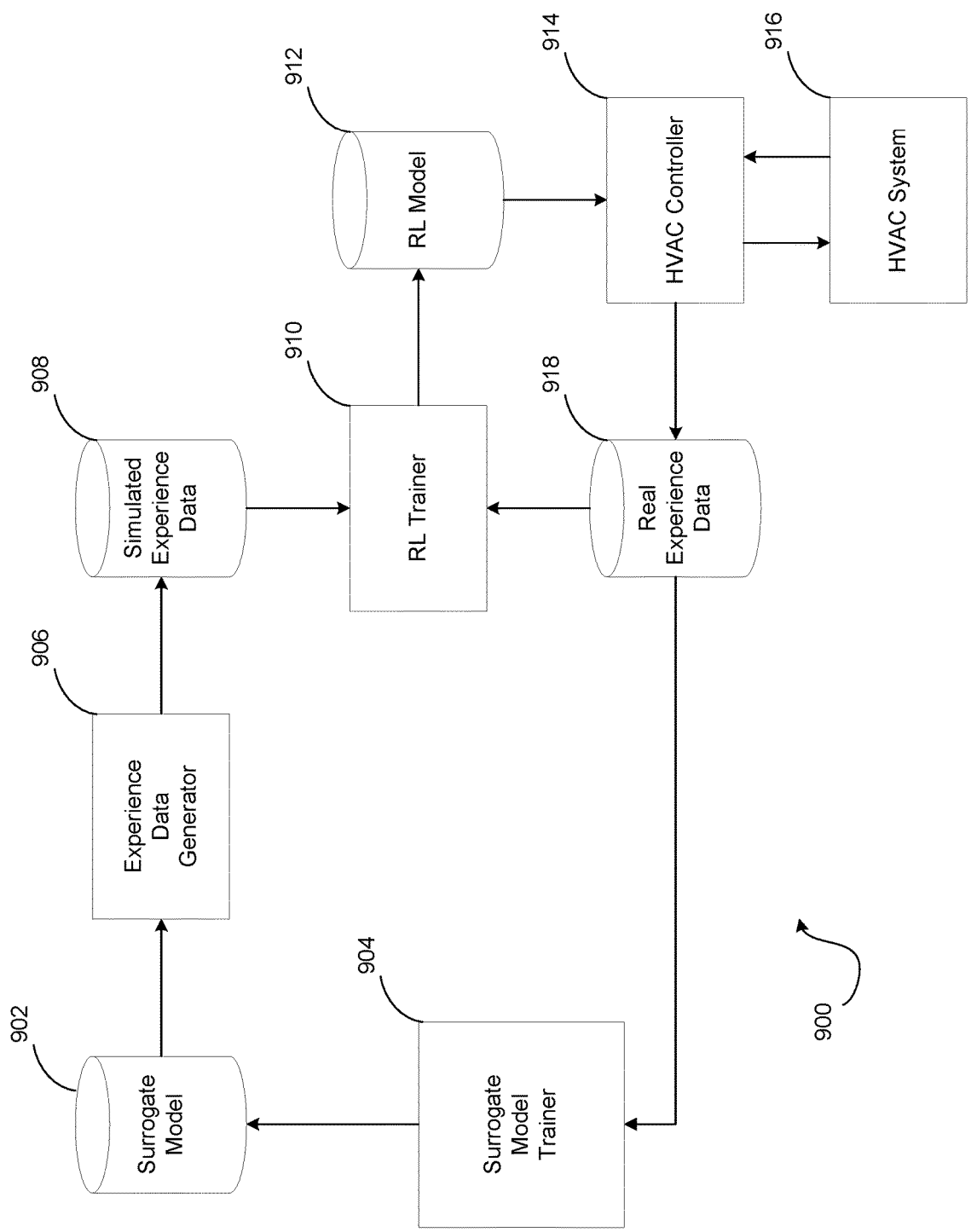
FIG. 9 is another block diagram of a building control system using a reinforcement learning model, according to some embodiments.

Referring now to FIG. 9, another embodiment of a training system 900 for training a RL model using real and simulated experience data is shown. Training system 900 includes a surrogate model 902, experience data generator 906, simulated experience data storage 908, RL trainer 910, RL model 1012, HVAC controller 914, HVAC system 916, real experience data 918, and surrogate model trainer 904. Training system 900 generally uses an RL model to control an HVAC system and generate real experience data that is used to retrain the surrogate model, such that the surrogate model can generate additional simulated experience data to retrain the RL model. This configuration provides an advantage where additional input domain can be explored for the RL model that otherwise may not often occur in actual operation of the HVAC system.

Surrogate model 902 can include any feature, configuration, or function of the surrogate model as described in relation to predictive modeler 602. In some embodiments, surrogate model 902 is a DNN. In some embodiments, the DNN is configured as a LSTM-S2S. Surrogate model 902 is generally used by experience data generator 906 to produce simulated experience data using input exogenous and endogenous parameters.

Surrogate model trainer 904 may include any feature, configuration, or function as described in relation to predictive modeler 602. Surrogate model trainer 904 may generally initialize, train, and retain surrogate model 902. Surrogate model trainer 904 may initially train surrogate model 902 using sample data from a different HVAC system than the HVAC system 916 controlled by the RL model 910. In some embodiments, surrogate model trainer 904 may use a calibrated simulation model of the HVAC system to generate sample data, and initially train the surrogate model 902 with the sample data.

Experience data generator 906 is generally configured to use the surrogate model to generate simulated experience data using the surrogate model 902. Experience data generator 906 may sample exogenous and endogenous parameters for input into surrogate model 902. In some embodiments, experience data generator 906 may simulate various control scenarios, such as pre-cooling algorithms. Experience data generator 906 stores simulated experience data in simulated experience storage 908.

RL trainer 910 may include any feature, configuration, or function as described in relation to RL trainer 608. In some embodiments, RL trainer 910 is configured to only use simulated experience data to retrain the RL model 912. In some such embodiments, RL trainer 910 may be configured to sample the simulated experience data based on when the simulated experience data as generated, such that experience data generated by the retrained surrogate model is prioritized for RL model training. In some embodiments, RL trainer 910 is configured to use both real and simulated experience data to retrain the RL model 912.

HVAC controller 914 and HVAC system 916 may include any feature, configuration, or function of controller 610 and HVAC system 612, respectively. Controller 914 may be configured to determine the current state of HVAC system 916 using sensor measurements from HVAC system 916. Controller 914 may be configured to use RL model 912 to determine the preferred action for HVAC system 916 to perform based on the output of RL model 912. Controller 914 may be configured to send one or more control signals or instructions to HVAC system 916 based on output of RL model 912. Controller 914 may be configured to generate real experience data and store the real experience data in real experience storage 918.

Surrogate model trainer 904 may be further configured to determine whether the surrogate model 902 should be retrained using the generated real experience data, sample the real experience data, and retrain the surrogate model 902 using the sampled training data. In some embodiments, training data can be sampled based on pre-defined measures. One measure can be defined to prioritize samples with high dynamic model prediction error. Another measure could be the Bellman gap. In some embodiments, training data can be sampled randomly. Retraining the surrogate model 902 may change one or more values of surrogate model 902. Surrogate model trainer 904 may be configured to train the surrogate model 902 after a predetermined number of real experience data points has been collected. In some embodiments, surrogate model trainer 904 may be configured to train the surrogate model 902 after a predetermined period of time as elapsed since the previous retraining of surrogate model 902. In some embodiments, surrogate model trainer 904 is configured to retrain the surrogate model 902 based on a user input.

In some embodiments, training system 900 can be configured to generate or collect initial real experience data responsive to actual operation of the HVAC system during an offline period of time. The offline period may be before the online operation of the HVAC system or otherwise under control of the trained RL model. The offline period may be a short time period relative to a time period over which the HVAC system operates in an online time period (e.g., a day, week, month). The initial real experience data may be generated responsive to random control actions of the HVAC system. In some embodiments, the RL trainer 910 may be configured to initialize the RL model 912 to generate the random control actions before later being trained using simulated experience data. Controller 914 may be configured to collect or generate the initial real experience data. RL trainer 910 or surrogate model trainer 904 may be configured to train the RL model 912 or surrogate model 902, respectively, using the initial real experience data in addition to or in the alternative to the other training data discussed herein, such as simulated experience data or data generated from the calibrated simulation model. Using the initial real experience data may improve initial training of the RL model or surrogate model by supplementing the simulated experience data with a small amount of real experience data.

Figure 10:
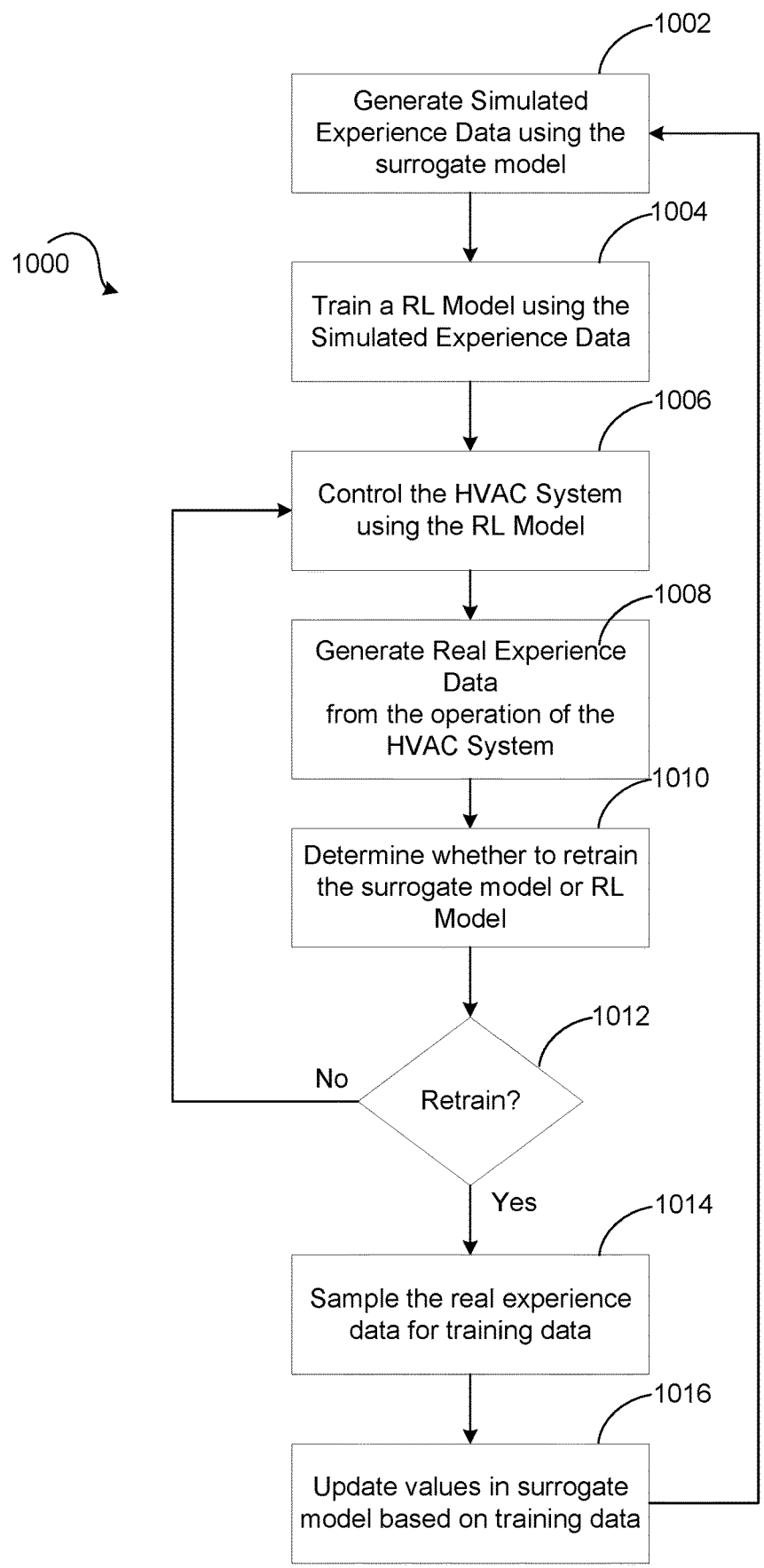
FIG. 10 is a flow diagram for training a surrogate model using real experience data in a reinforcement learning model controller, according to some embodiments.

Referring now to FIG. 10, another flow diagram 1000 for training a RL model using a retrained surrogate model is shown. Flow diagram may be executed by one or more computing devices, such as the various components of training system 900. At 1002, simulated experience data may be generated using a surrogate model. In other embodiments, the simulated experience data may be retrieved from a storage device. The surrogate model may be trained using experience data generated by a calibrated simulation model. In some embodiments, the surrogate model may be trained using initial real experience data generated by the HVAC system during an offline period of time prior to an online operation, in addition to or alternatively to other training data. In some embodiments, the initial real experience data may be random experience data generated from random control actions of the HVAC system.

At 1004, a RL model is trained using the simulated experience data. The simulated experience data can be sampled according to any of the methods described herein. In some embodiments, the simulated experience data is sampled randomly. In some embodiments, the simulated experience data is sampled based on a Bellman gap calculation. Part or all of the simulated experience data may be generated by the surrogate model, another dynamics model, or multiple dynamics models. Initial real experience data may also be included as training data in training the RL model.

At 1006, the HVAC system is controlled using the trained RL model. The HVAC system may be controlled by a controller using the RL model. The controller may determine a current state of the HVAC system using sensor and operational measurements from the HVAC system. The controller may determine a control action for the HVAC system to perform based on the output of the RL model. The controller may send one or more control signals or instructions to the HVAC system based on the output of the RL model.

At 1008, real experience data is generated based on the operation of the HVAC system. The real experience data may include a state, an action performed at the state, a future or resultant state, and a reward for performing the action at the state. The real experience data may use a predetermined period of time to determine the future state of the HVAC system. In some embodiments, the real experience data may be generated periodically rather than for each control action sent by the controller to the HVAC system.

At 1010, a determination whether to retrain the surrogate model or RL model is made. The determination may be based on a time period since the previous time the RL model or the surrogate model was retrained. In some embodiments, the determination to retrain the surrogate model or the RL model is based on a number of real experience data samples generated. In some embodiments, the determination to retrain the surrogate model or the RL model is based on time such that the models are less likely to be retrained over time. In some embodiments, the determination to retrain the RL model or the surrogate model is based on a user input. In some embodiments, the determination to retrain the RL model or the surrogate model is based on a probabilistic function, wherein a random value is generated, and responsive to the random value meeting a criteria, determining the RL model or surrogate model should be retrained. The determination may cause both the surrogate model to be retrained and the RL model to be retrained. In some embodiments, the surrogate model is retrained before the RL model is retrained.

In some embodiments, a separate determination is made for retraining each of the surrogate model and retraining the RL model. The separate determinations may be configured in any ways as described above. In some such embodiments, similar criteria may be used as discussed in regards to FIG. 8 to retrain the RL model. In some embodiments, the determination may include whether to retrain the surrogate model using real or simulated experience data. One of the distinct determinations may cause its respective model to be retrained, but not the other model. In this way, one of the RL model or the surrogate model may be retrained more than one time for each instance the other model is retrained.

If the determination at 1010 indicates the surrogate model or RL model should not be retrained, the system continues control of the HVAC system using the RL model at 1006 and generating additional real experience data. If the determination at 1010 indicates the surrogate model or the RL model will be retrained, the surrogate model is retrained by first sampling the real experience data for training data at 1014. The real experience data may be sampled according to any disclosed method. The sampling at 1014 may sample for one or more training data samples.

At 1016, one or more values of the surrogate model are updated based on the sampled training data. The updated values may more accurately reflect the actual operation and dynamics of the building and HVAC system. The retrained surrogate model can then be used to generate additional or updated simulated experience data at 1002, wherein the simulated experience data can later be used to retrain the RL model at 1004. In some embodiments, the surrogate model is retrained multiple times before the RL model is retrained.

Figure 11:
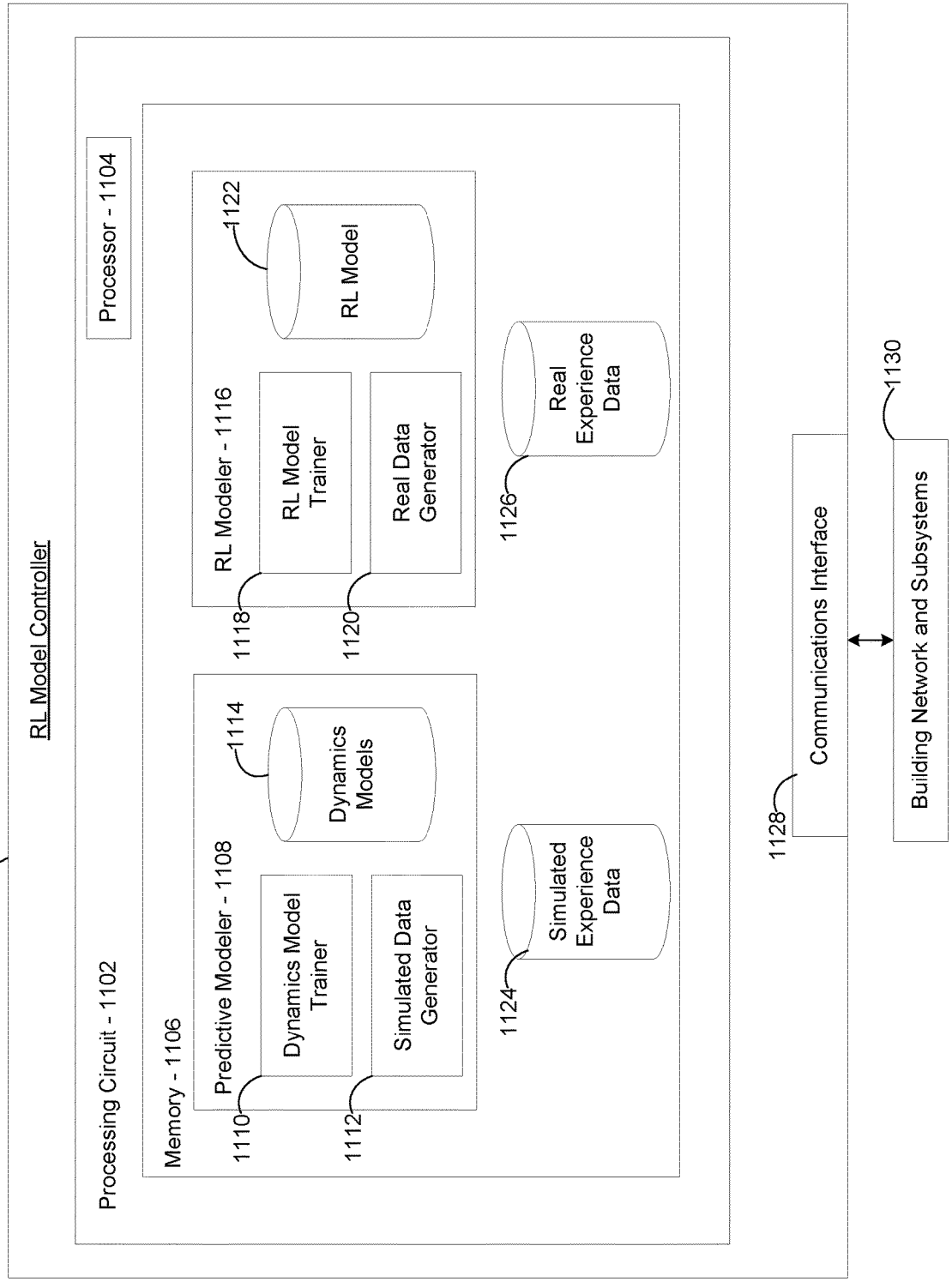
FIG. 11 is block diagram of computing system to train a reinforcement learning model for HVAC control, according to some embodiments.

Referring now to FIG. 11, a RL model controller 1100 is shown, according to one embodiment. RL model controller 1100 may be configured within, or performed by a BMS, such as BMS 400. RL model controller 1100 may be configured as one or more distinct processing circuits 1102 that comprise at least a processor 1104 and memory 1106. Processor 1104 is configured to use instructions stored in memory 1106 to execute one or more functions. In some embodiments, any component of memory 1106 may be configured as a distinct circuit or controller. RL model controller 1100 may be configured to perform the functions of any of flow diagram 800 or flow diagram 1000.

Processing circuit 1102 can comprise one or more processing circuits that can be communicably connected to communications interface 1128 such that processing circuit 1102 and the various components thereof can send and receive data via communications interface 1102 (e.g., to/from building network 1130, etc.). Processor 1104 can be implemented as one or more general purpose processors, application specific integrated circuits (ASIC), one or more field programmable gate arrays (FPGAs), a group of processing components, or other suitable electronic processing components.

Memory 1106 (e.g., memory, memory unit, storage device, etc.) can include one or more devices (e.g., RAM, ROM, Flash memory, hard disk storage, etc.) for storing data or computer code for completing or facilitating the various processes, layers and modules described in the present application. Memory 1106 can be or include volatile memory or non-volatile memory. Memory 1106 can include database components, object code components, script components, or any other type of information structure for supporting the various activities and information structures described in the present application. According to an example embodiment, memory 1106 is communicably connected to processor 1104 via processing circuit 802 and includes computer code for executing (e.g., by processing circuit 1102 or processor 1104) one or more processes described herein. In some embodiments, RL model controller 1100 is implemented within a single computer (e.g., one server, one housing, etc.). In various other embodiments, RL model controller 1100 can be distributed across multiple servers or computers (e.g., that can exist in distributed locations).

Memory 1106 comprises predictive modeler 1108, RL modeler 1116, simulated experience data storage 1124, and real experience data storage 1126. Predictive modeler 1108 may comprise any of the features or configurations of predictive modeler 602, surrogate model trainer 904, or experience data generator 906. RL modeler 1116 may comprise any of the features or configurations of RL trainer 608, RL trainer 910, RL controller 610, or RL controller 912. Simulated experience data storage 1124 can be any memory device configured to store simulated experience data. Real experience data storage 1126 can be any memory device configured to store real experience data. In some embodiments, the simulated experience data storage 1126 and the real experience data storage 1128 are configured as the same memory device or database.

Predictive modeler 1108 may generally generate simulated experience data to train an RL model. Predictive modeler 1108 includes dynamics model trainer 1110, simulated data generator 1112, and dynamics models 1114. Dynamics model trainer 1110 may train any of dynamics models 1114 using sample data. Simulated data generator may use dynamics models 1114 to generate simulated experience data. Dynamics models 1114 may include one or more of a calibrated simulation model or surrogate model of the HVAC system.

RL modeler 1116 may generally train the RL model 1122 using various experience data. RL modeler 1116 includes RL model trainer 1118, real data generator 1120, and RL model 1122. RL model trainer 1118 may generally train and retrain RL model 1122 based on real and simulated experience data for the HVAC system. Real data generator 1120 may use information received from the HVAC system during operation to generate real experience data. RL model 1122 may be any RL control model discussed herein, wherein the RL model is used to control the HVAC system by determining a control action to perform in a given state of the HVAC system. RL modeler may be configured to communicate with an HVAC controller such that the controller can determine control actions or instructions based on output of the RL model. In some embodiments, RL modeler 1116 comprises the HVAC controller can is configured to communicate with the HVAC system via communications interface 1128.

Communications interface 1128 can be or include wired or wireless communications interfaces (e.g., jacks, antennas, transmitters, receivers, transceivers, wire terminals, etc.) for conducting data communications with building subsystems 1130 or other external systems or devices. In various embodiments, communications via interface 1128 can be direct (e.g., local wired or wireless communications) or via a communications network (e.g., a WAN, the Internet, a cellular network, etc.). For example, interface 1128 can include an Ethernet card and port for sending and receiving data via an Ethernet-based communications link or network. In another example, interface 1128 can include a Wi-Fi transceiver for communicating via a wireless communications network. In another example, interface 1128 can include cellular or mobile phone communications transceivers. In one embodiment, communications interface 818 is a power line communications interface. Interface 1128 can be configured to interface with external computing devices and sensors. Communications interface 1128 may generally interface RL model controller 1100 to a building network or subsystems 1130, such as, a BMS network, the HVAC system, HVAC controller, or other various building systems.

Configuration of Exemplary Embodiments

It should be appreciated that the systems and methods disclosed herein can be used to control any building equipment system that affects a condition of a building or space, such as, but not limited to, an HVAC system, waterside system, airside system, electrical system, or any other building equipment system. The illustrations and descriptions herein describe embodiments configured to control of an HVAC system, but these and other embodiments can be extended to control any one of the other building equipment systems.

It should also be appreciated that the systems and methods disclosed herein can utilize any machine learning control algorithm. RL and DRL models provide a framework for state-driven control using training data, but other models can be used to control the building equipment, such as, but not limited to, genetic algorithm control, neural network control, artificial intelligence, and other machine learning control.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for training a reinforcement learning (RL) model for controlling an HVAC system, the method comprising:
   receiving first experience data for the HVAC system, the first experience data being simulated experience data, wherein the simulated experience data is generated using a simulation model and a surrogate model of the HVAC System;
   training the RL model using the first experience data;
   receiving second experience data for the HVAC system, the second experience data generated responsive to operation of the HVAC system using the RL model; and
   retraining the RL model using the second experience data.

2. The method of claim 1, wherein the simulation model and the surrogate model are configured to predict a response of the HVAC system to an input condition.

3. The method of claim 2, wherein the surrogate model includes a deep neural network.

4. The method of claim 1, wherein the RL model is a deep reinforcement learning model comprising at least one neural network.

5. The method of claim 1, further comprising determining whether to retrain the RL model based on a probability function, the determining comprising generating a random number, and responsive to the random number satisfying a criteria condition, determining to retrain the RL model.

6. The method of claim 5, wherein the probability function decreases a probability that the RL model will be retrained over time.

7. The method of claim 1, wherein retraining the RL model further comprises using at least some of the first experience data.

8. The method of claim 7, wherein retraining the RL model comprises sampling at least the first experience data or the second experience data for retraining data.

9. The method of claim 8, wherein the at least first experience data or second experience data is sampled based on a model error metric between an output of the RL model and an expected model output.

10. The method of claim 8, wherein sampling the at least first experience data or second experience data is based on previously sampled experience data.

11. A system for training a reinforcement learning (RL) control model for an HVAC system, the system comprising one or more processing circuits configured to:
    generate simulated experience data for the HVAC system using a dynamics model, wherein the dynamics model includes a simulation model and a surrogate model of the HVAC system;
    train the RL control model for the HVAC system using the simulated experience data;
    generate real experience data using information received from the HVAC system during operation of the HVAC system; and
    retrain the RL control model using the real experience data.

12. The system of claim 11, wherein the one or more processing circuits are integrated within a building management system (BMS).

13. The system of claim 11, wherein the simulation model and the surrogate model are configured to predict a response of the HVAC system to an input condition.

14. The system of claim 13, wherein the surrogate model comprises a deep neural network.

15. The system of claim 11, wherein the RL model is a deep reinforcement learning model comprising at least one neural network.

16. The system of claim 11, wherein the one or more processing circuits use both the real experience data and the simulated experience data to retrain the RL model.

17. The system of claim 16, wherein the one or more processing circuits are further configured to sample the simulated experience data or the real experience data for training data.

18. The system of claim 17, wherein the one or more processing circuits sample the simulated experience data and the real experience data separately.

19. The system of claim 11, wherein the one or more processing circuits are further configured to determine a state of the HVAC system from the received information, and input the state into the RL model to determine the one or more control actions.

20. The system of claim 11, wherein the one or more processing circuits are further configured to determine whether to retrain the RL model based on a probability function.

21. The system of claim 20, wherein the probability function decreases a probability that the RL model will be retrained over time.

22. One or more non-transitory computer readable storage media having instructions stored thereon that, when executed by one or more processors, cause the one or more processors to:
generate simulated experience data for an HVAC system using a dynamics model of a building in which the HVAC system operates, wherein the dynamics model includes a simulation model and a surrogate model of the HVAC system;
train a deep reinforcement learning (DRL) model for the HVAC system using the simulated experience data;
send one or more control instructions to the HVAC system based on an output of the DRL model;
generate real experience data using information received from the HVAC system under operation influenced by the one or more control instructions; and
retrain the DRL model using the real experience data and the simulated experience data.

23. The one or more storage media of claim 22, wherein the surrogate model comprises a deep neural network, wherein the simulation model and the surrogate model are configured to predict a response of the HVAC system to an input condition.

24. The one or more storage media of claim 22, wherein the one or more processors are further caused to determine whether to retrain the RL model, the determination comprising generating a random number, and responsive to the random number satisfying a criteria condition, determining to retrain the DRL model.

25. The one or more storage media of claim 24, wherein the probability function decreases a probability that the DRL model will be retrained over time.

26. The one or more storage media of claim 22, wherein the simulated experience data and real experience data are sampled based on previously sampled training data to retrain the DRL model.

* * * * *